(12) United States Patent  
Roberts et al.

(10) Patent No.: US 7,221,363 B2
(45) Date of Patent: May 22, 2007

(54) VEHICLE INFORMATION DISPLAYS

(75) Inventors: John K. Roberts, East Grand Rapids, MI (US); Frederick T. Bauer, Holland, MI (US); Darin D. Tuttle, Byron Center, MI (US); Harold C. Ockerse, Holland, MI (US); Robert R. Turnbull, Holland, MI (US); David M. Falb, Grand Rapids, MI (US)

(73) Assignee: Gentex Corporation, Zeeland, MI (US)

( * ) Notice: Subject to any disclaimer, the term of this patent is extended or adjusted under 35 U.S.C. 154(b) by 101 days.

(21) Appl. No.: 10/775,434

(22) Filed: Feb. 10, 2004

(65) Prior Publication Data

US 2004/0202001 A1    Oct. 14, 2004

Related U.S. Application Data

(60) Provisional application No. 60/446,872, filed on Feb. 12, 2003.

(51) Int. Cl.
*G09G 5/00* (2006.01)

(52) U.S. Cl. .......................... 345/204; 345/156; 345/8

(58) Field of Classification Search .......... 345/76, 345/102, 204, 8, 156, 98; 315/169.3, 169.1; 313/495, 512, 495.116; 359/265, 872, 625, 359/630, 603; 362/494, 492, 545; 455/348, 455/90.3; 340/815.4; 349/74, 112, 64, 69, 349/86; 385/146

See application file for complete search history.

(56) References Cited

U.S. PATENT DOCUMENTS

| | | | |
|---|---|---|---|
| 4,704,740 A * | 11/1987 | McKee et al. ............. 455/348 |
| 5,005,009 A | 4/1991 | Roberts | |
| 5,014,167 A | 5/1991 | Roberts | |
| 5,128,659 A | 7/1992 | Roberts et al. | |
| 5,166,815 A * | 11/1992 | Elderfield ................. 349/64 |
| 5,207,492 A | 5/1993 | Roberts | |
| 5,469,187 A * | 11/1995 | Yaniv ...................... 345/98 |
| 5,475,366 A * | 12/1995 | Van Lente et al. ........ 340/525 |
| 5,603,104 A * | 2/1997 | Phelps et al. ............ 455/90.3 |
| 5,645,337 A * | 7/1997 | Gleckman ................ 362/29 |
| 5,788,357 A | 8/1998 | Muth et al. | |
| 5,803,579 A | 9/1998 | Turnbull et al. | |
| 5,936,774 A * | 8/1999 | Street ..................... 359/630 |
| 5,949,331 A | 9/1999 | Schofield et al. | |
| 5,949,346 A | 9/1999 | Suzuki et al. | |
| 5,963,284 A * | 10/1999 | Jones et al. .............. 349/112 |
| 6,000,823 A | 12/1999 | Desmond et al. | |
| 6,087,953 A | 7/2000 | DeLine et al. | |
| 6,111,683 A | 8/2000 | Cammenga et al. | |
| 6,124,886 A | 9/2000 | DeLine et al. | |
| 6,139,172 A | 10/2000 | Bos et al. | |
| 6,157,424 A * | 12/2000 | Eichenlaub .............. 349/74 |
| 6,166,848 A * | 12/2000 | Cammenga et al. ....... 359/267 |
| 6,170,956 B1 | 1/2001 | Rumsey et al. | |
| 6,172,613 B1 | 1/2001 | DeLine et al. | |
| 6,176,602 B1 | 1/2001 | Pastrick et al. | |
| 6,183,119 B1 | 2/2001 | Desmond et al. | |
| 6,222,447 B1 | 4/2001 | Schofield et al. | |

(Continued)

*Primary Examiner*—Bipin Shalwala
*Assistant Examiner*—Prabodh Dharia
(74) *Attorney, Agent, or Firm*—Price, Heneveld, Cooper, DeWitt & Litton, LLP; James E. Shultz, Jr.

(57) ABSTRACT

The present invention relates to information display assemblies and various covert displays using the same.

21 Claims, 8 Drawing Sheets

U.S. PATENT DOCUMENTS

| | | |
|---|---|---|
| 6,222,460 B1 | 4/2001 | DeLine et al. |
| 6,255,781 B1 * | 7/2001 | Tsumura .................. 315/169.1 |
| 6,257,746 B1 | 7/2001 | Todd et al. |
| 6,276,821 B1 | 8/2001 | Pastrick et al. |
| 6,291,906 B1 * | 9/2001 | Marcus et al. ............. 307/10.1 |
| 6,294,989 B1 | 9/2001 | Schofield et al. |
| 6,300,879 B1 * | 10/2001 | Regan et al. ................ 340/654 |
| 6,326,900 B2 | 12/2001 | DeLine et al. |
| 6,329,925 B1 | 12/2001 | Skiver et al. |
| 6,331,066 B1 | 12/2001 | Desmond et al. |
| 6,335,548 B1 | 1/2002 | Roberts et al. |
| 6,356,376 B1 | 3/2002 | Tonar et al. |
| 6,366,213 B2 | 4/2002 | DeLine |
| 6,386,742 B1 | 5/2002 | DeLine |
| 6,412,973 B1 | 7/2002 | Bos et al. |
| 6,416,208 B2 | 7/2002 | Pastrick et al. |
| 6,424,786 B1 * | 7/2002 | Beeson et al. ............... 385/146 |
| 6,428,172 B1 | 8/2002 | Hutzel et al. |
| 6,441,943 B1 | 8/2002 | Roberts et al. |
| 6,445,287 B1 | 9/2002 | Schofield et al. |
| 6,452,572 B1 * | 9/2002 | Fan et al. ....................... 345/8 |
| 6,483,438 B2 | 11/2002 | DeLine et al. |
| 6,498,620 B2 | 12/2002 | Schofield et al. |
| 6,501,387 B2 | 12/2002 | Skiver et al. |
| 6,521,916 B2 | 2/2003 | Roberts et al. |
| 6,550,949 B1 * | 4/2003 | Bauer et al. ................. 362/545 |
| 6,568,839 B1 | 5/2003 | Pastrick et al. |
| 6,611,202 B2 | 8/2003 | Schofield et al. |
| 6,614,419 B1 * | 9/2003 | May ........................... 345/156 |
| 6,642,851 B2 | 11/2003 | Deline et al. |
| 6,648,477 B2 | 11/2003 | Hutzel et al. |
| 6,670,207 B1 | 12/2003 | Roberts |
| 6,672,744 B2 | 1/2004 | DeLine et al. |
| 6,685,348 B2 | 2/2004 | Pastrick et al. |
| 6,690,268 B2 | 2/2004 | Schofield et al. |
| 6,756,912 B2 | 6/2004 | Skiver et al. |
| 6,829,071 B2 * | 12/2004 | Allen et al. .................. 359/247 |
| 6,870,655 B1 * | 3/2005 | Northman et al. ........... 359/265 |
| 6,891,677 B2 * | 5/2005 | Nilsen et al. ................ 359/625 |
| 7,042,616 B2 * | 5/2006 | Tonar et al. ................. 359/265 |
| 2002/0057267 A1 * | 5/2002 | Turnbull ...................... 345/204 |
| 2002/0159270 A1 * | 10/2002 | Lynam et al. ................ 362/492 |
| 2003/0052772 A1 * | 3/2003 | DeLine et al. ............ 340/425.5 |
| 2003/0146680 A1 * | 8/2003 | Wei ............................. 313/116 |
| 2003/0156425 A1 * | 8/2003 | Turnbull et al. ............. 362/545 |
| 2003/0209991 A1 * | 11/2003 | Tsumura .................. 315/169.3 |
| 2004/0008410 A1 * | 1/2004 | Stam et al. ................... 359/443 |
| 2004/0032675 A1 * | 2/2004 | Weller et al. ................ 359/872 |
| 2004/0145457 A1 * | 7/2004 | Schofield et al. ......... 340/425.5 |
| 2004/0160657 A1 * | 8/2004 | Tonar et al. ................. 359/265 |
| 2004/0202001 A1 * | 10/2004 | Roberts et al. .............. 362/494 |
| 2004/0239243 A1 * | 12/2004 | Roberts et al. .............. 313/512 |
| 2005/0007256 A1 * | 1/2005 | DeLine et al. ............ 340/815.4 |
| 2005/0007645 A1 * | 1/2005 | Tonar et al. ................. 359/265 |
| 2005/0195488 A1 * | 9/2005 | McCabe et al. ............. 359/603 |
| 2006/0050018 A1 * | 3/2006 | Hutzel et al. .................. 345/60 |
| 2006/0119765 A1 * | 6/2006 | Abileah ......................... 349/86 |
| 2006/0164230 A1 * | 7/2006 | DeWind et al. ............. 340/461 |
| 2006/0187378 A1 * | 8/2006 | Bong et al. .................... 349/69 |

* cited by examiner

FIG. 2a
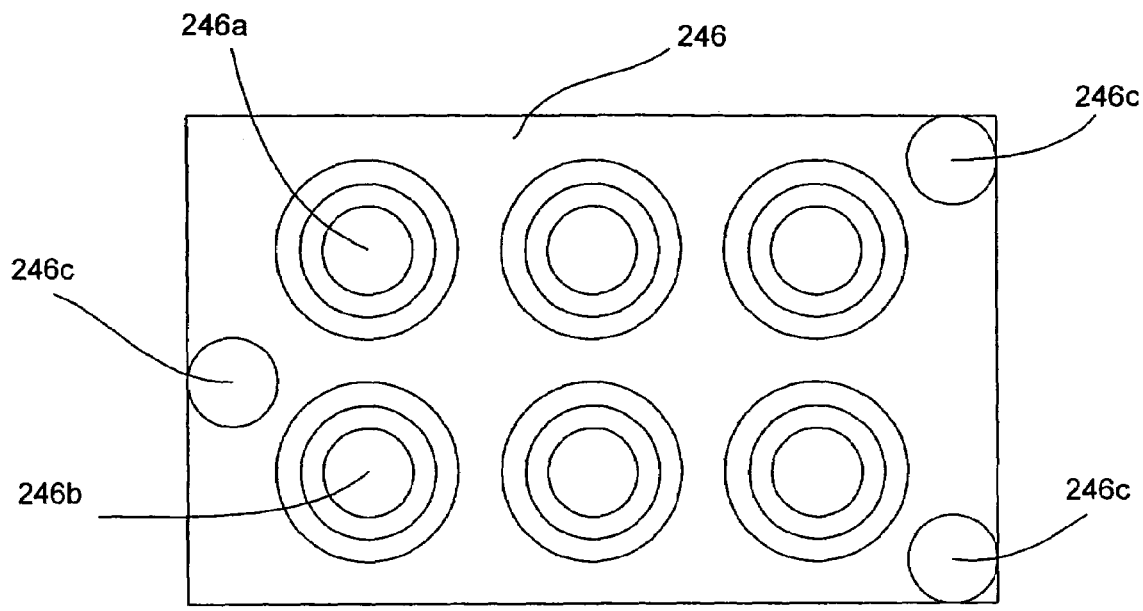
FIG. 2b
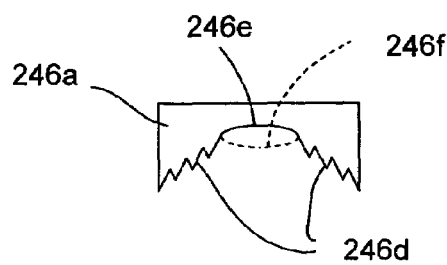
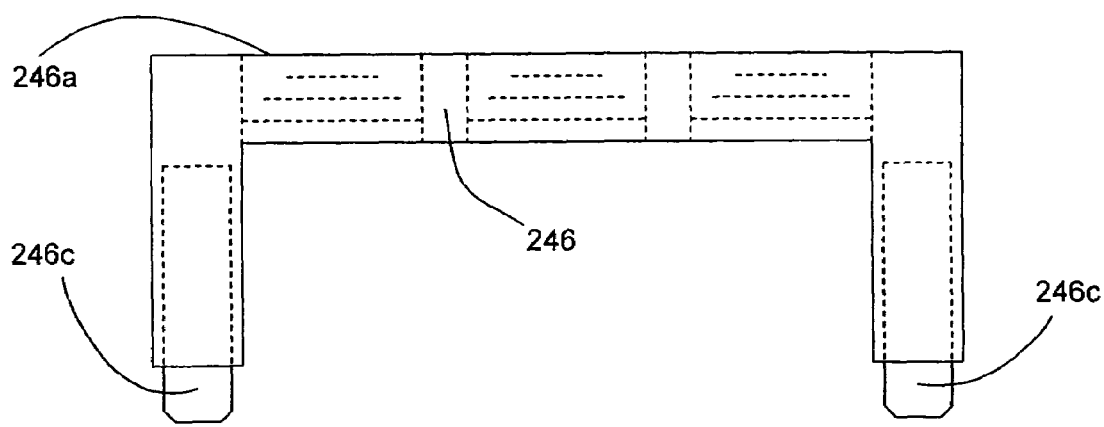
FIG. 2c

VEHICLE INFORMATION DISPLAYS

CROSS-REFERENCE TO RELATED APPLICATION

This application claims the benefit of U.S. Provisional Application No. 60/446,872, filed Feb. 12, 2003. The entire disclosure of which is incorporated herein by reference.

BACKGROUND OF THE INVENTION

The present invention relates to information displays for use within a vehicle. More specifically, visual information displays are disclosed that are positioned behind an element, with respect to a viewer, such that the information displays, or portions thereof, are substantially invisible when not illuminated.

Recently, elements have been developed for rearview mirror assemblies that exhibit transflective characteristics. Light sources and/or information displays can be position behind the transflective element, with respect to the viewer, such that the light source or information display is substantially invisible when not illuminated. However, when illuminated while in operation, the light rays emitted by the information display and/or backlighting pass through the transflective element such that the related information is visible.

When the transflective feature is combined with an automatically variable reflective mirror, such as an electrochromic self-dimming mirror, the loss of intensity is substantial as the light rays emitted by the information display pass through the transflective materials and the electrochromic medium. A total of ninety-five percent loss in intensity can be expected when a backlit liquid crystal display is used.

Incorporating a backlit liquid crystal display, or a backlit information display of any type, with a transflective, variable reflectance, element has many inherent challenges in addition to overcoming attenuation of the intensity of the associated light rays. The transflective, variable reflectance, element may impact display color rendering, as well as, the focus, contrast, and viewing angle associated with the display. Specular reflections and color dispersion are also problematic when incorporating an information display with a transflective element.

What is needed is an information display design and an optimized transflective, directionally transmissive, preferentially reflective, partially reflective, preferentially absorbent, partially absorbent, preferentially transmissive or partially transmissive element to provide an aesthetically pleasing information display. Preferably, the information display is substantially invisible when not illuminated and produces focused, aesthetically pleasing, characters and/or graphical indicia when in operation.

SUMMARY OF THE INVENTION

Information displays are provided that are substantially invisible when not illuminated. Additionally, focused, aesthetically pleasing, information displays are provided that are capable of depicting alphanumeric and/or graphical detail with a desirable viewing angle.

In one embodiment, an information display is provided that incorporates information display backlighting that is character specific. When a given character of the associated information display is not used or needed, the backlighting associated with the given character is not illuminated.

In another embodiment, an information display is provided with a liquid crystal display (LCD), a display driver and associated backlighting. The preferred display driver is provided with the ability to control more characters than the given LCD has and the additional character control capacity of the display driver is used for control of the associated backlighting.

In a further embodiment, the intensity of the information display and/or associated backlighting is automatically controlled as a function of a glare sensor, an ambient sensor, a sky sensor or a combination of the glare and ambient sensor, glare and sky sensor, ambient and sky sensor or the ambient, glare and sky sensors. In a related embodiment, the intensity of the information display and/or associated backlighting is a function of the light transmission characteristics of an associated element.

In yet another embodiment, an information display is provided with a diffuser to redirect the light rays emitted from the information display and/or backlighting. In a related embodiment, the information display incorporates an optics block with lenses associated with the individual information display backlights. Preferably, the direction of the light rays emitted from the information display is a function of the position of the display relative to an anticipated viewer. Preferably, the direction of the light rays emitted from the information display and as redirected by the lens and/or diffuser is a function of a planar surface defined by the diffuser relative the viewing angle of an anticipated viewer.

In another embodiment, multicolored backlighting and/or multicolored displays are provided such that the color of the information being displayed is a function of a corresponding information status input. In a related embodiment, the information display may flash and/or have an intensity that is a function of the information status input.

In yet another embodiment, an operator interface is provided to provide the user with the ability to select the information that is displayed on a given information display. In a related embodiment, the format of the information display may be reconfigurable utilizing an operator interface.

In yet a further embodiment, an information display is provided in combination with an element. The information display is position behind the element with respect to the viewer. In a preferred embodiment, the light transmission characteristics of the element are such that the information display is substantially invisible when not illuminated. In a related embodiment, the light transmission characteristics of the element are a function of the predominant wavelength of the light emitted by the associated information display and/or backlighting.

In yet further embodiments, an information display is, or multiple displays are, incorporated in various vehicle assemblies such as interior or exterior rearview mirrors, consoles, instrument panels, dash boards, sun visors, and the like.

Additional advantages of the present invention will become apparent when reading the detail description in light of the accompanying figures and appended claims.

BRIEF DESCRIPTION OF THE FIGURES

FIG. 2a depicts a top plan view of an optics block used in an embodiment of the present invention;

FIG. 2b depicts a cross-sectional view of an exemplary lens of the optics block shown in FIG. 2a;

FIG. 2c depicts an elevational side view of the optics block shown in FIG. 2a;

DETAIL DESCRIPTION OF THE INVENTION

Figure 1:
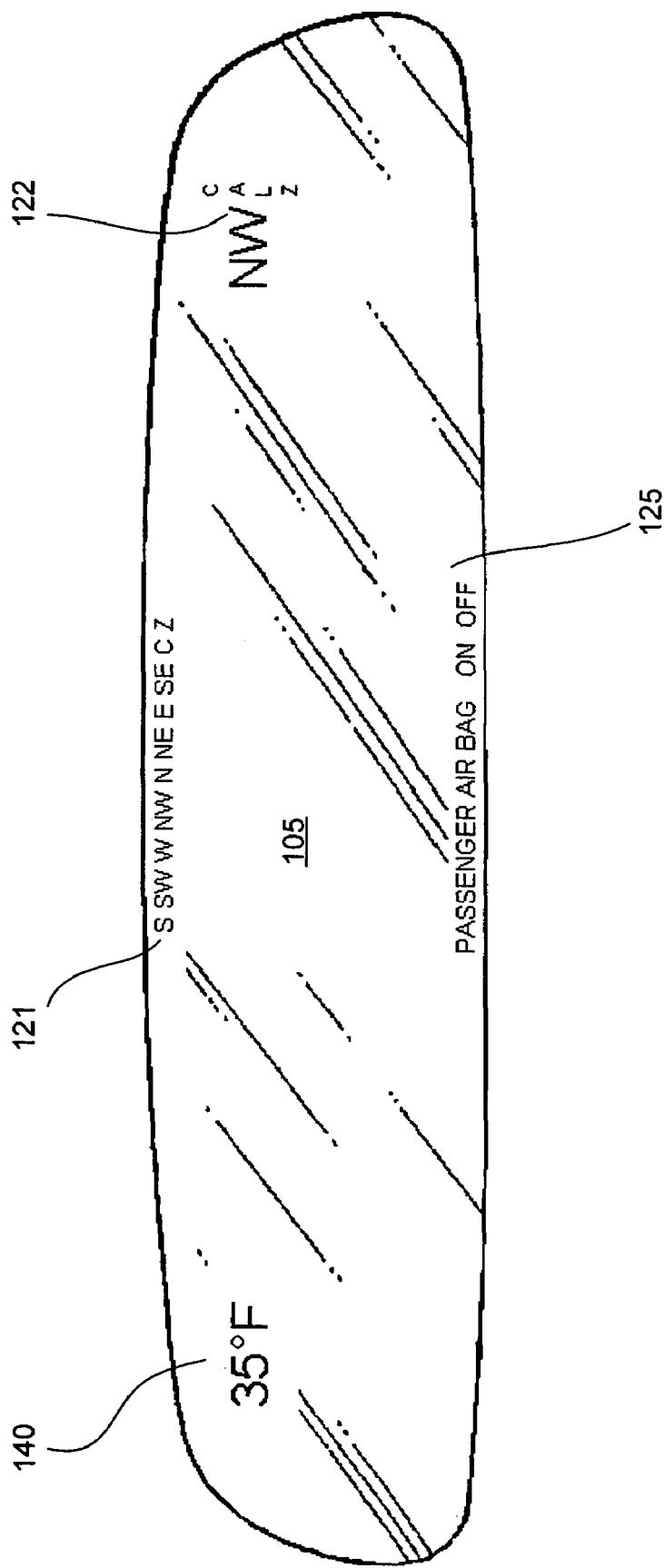
FIG. 1 depicts an element with information display areas.

Referring initially to FIG. 1, there is shown an element 105 comprising first, second, third and fourth information display areas 121, 122, 125, 140. Although four spaced apart and separate information display areas are shown, it should be understood that any number of information display areas may be incorporated. The individual information display areas may comprise the shapes depicted in FIG. 1 or may be circular, elliptical, square, triangular, hexagonal, or any other geometric shape. In one embodiment the individual information display areas may be positioned at any location within the area defined by the perimeter of the element. Individual information displays are described in detail herein.

It should be understood that alphanumeric displays, graphical displays, video displays, and combinations thereof are within the scope of the present invention. Although the information display areas shown in FIG. 1 depict the temperature outside the vehicle, compass and passenger air bag related information, it should be understood that information related to any vehicle related device may be displayed including, but not limited to, telemetry information; vehicle speed; engine status, such as oil level, oil temperature, coolant temperature, coolant level, RPM information, fuel consumption, air filter status, fuel filter status, timing, ignition, carburetor status, fuel injection status, etc.; fuel tank level; door status; battery status; tire pressure; exterior light status; vehicle mileage; trip mileage; seat belt status; door lock status; vehicle interior temperature; radio information; heater status; air conditioner status; defroster status; defogger status; vehicle occupancy status; GPS information; mirror dimming status; rain sensor status; real time rearview from a camera; parking break status; vehicle maintenance reminders; cruise control system status; blinker signal indicators; real time side view from a camera; train crossing or approaching indication; driving direction information; proximity of other vehicle or object indication; a clock display; weather information; telephone display; internet display; email display; pager display; blind spot indicator; hazard warning; collision avoidance information; lane departure warning; windshield washer fluid status; safety vehicle (siren) warning; windshield wiper status; exhaust status indicator; caller I.D.; incoming telephone call number; outgoing telephone call number; taxi toll fees and travel time; automatic highway toll booth transaction information; etc.

Figure 5:
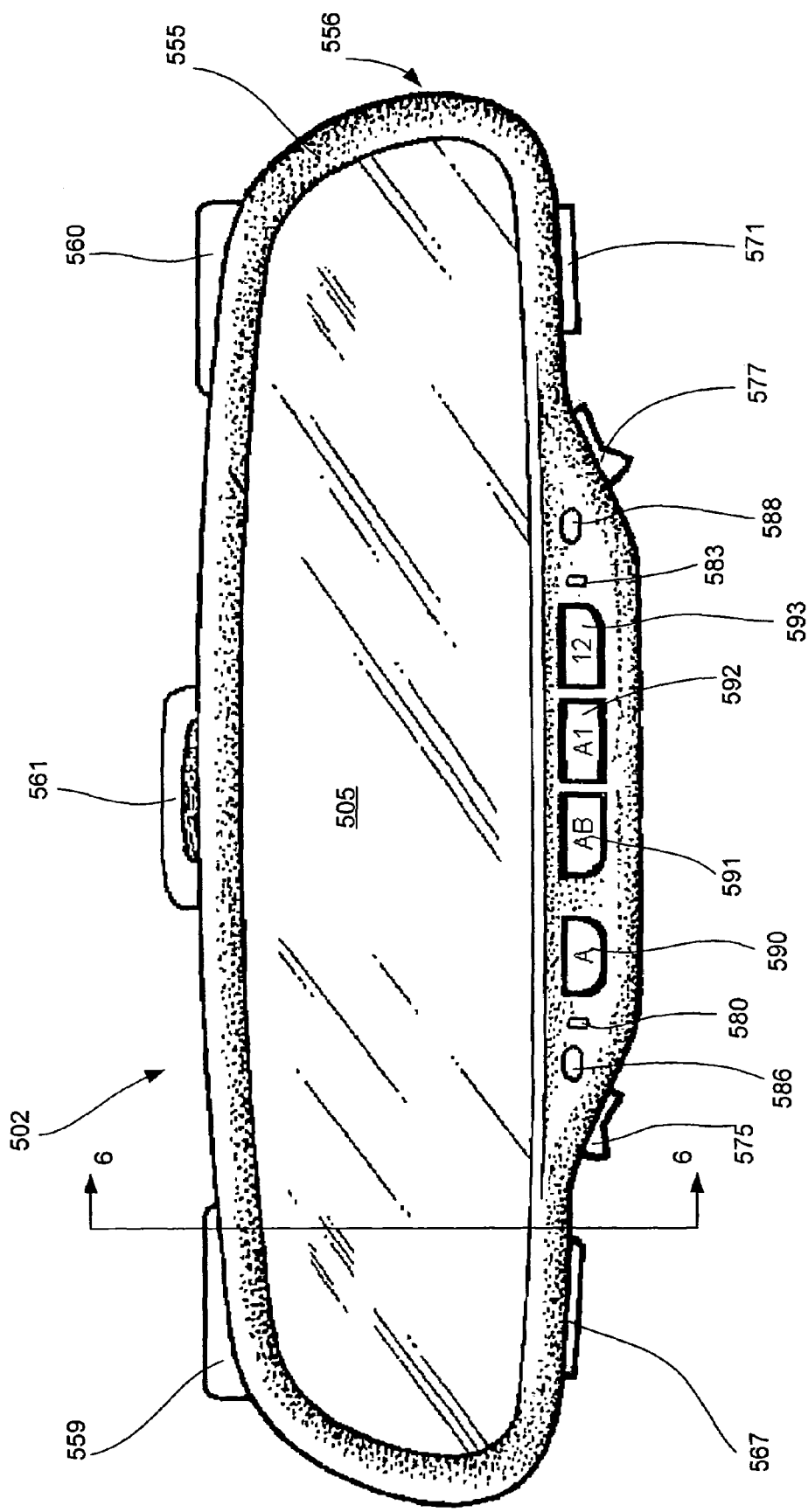
FIG. 5 depicts one embodiment of a mirror assembly in accordance with the present invention with information displays.
Figure 6:
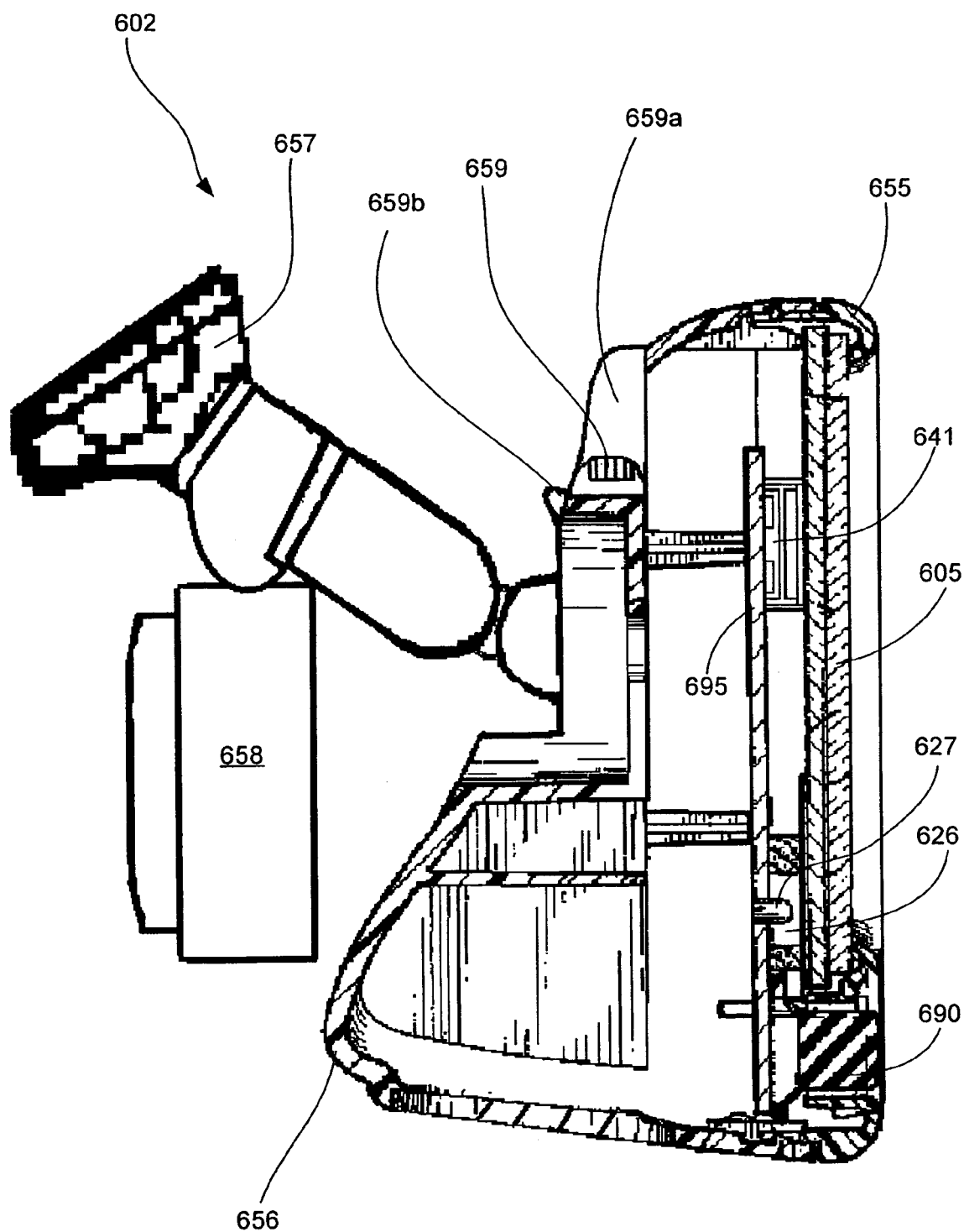
FIG. 6 depicts a sectional view of a mirror assembly in accordance with the present invention with information displays.
Figure 7:
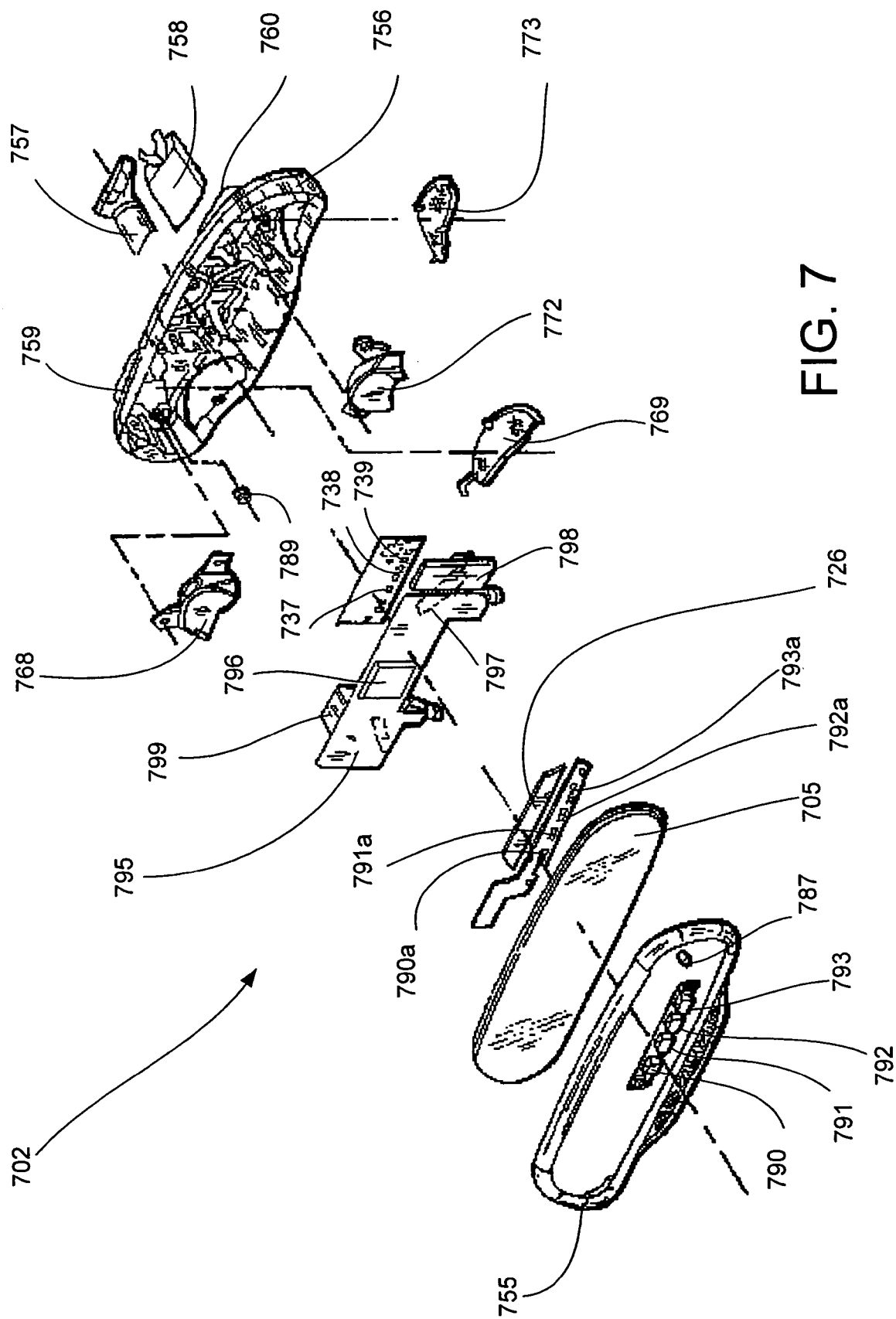
FIG. 7 depicts an exploded view of a mirror assembly in accordance with the present invention with information displays.

FIGS. 5–7 depict information displays and associated elements, in accordance with the present invention, incorporated into interior rearview mirror assemblies for use in motor vehicles. It should be understood that information displays and transflective, partially transmissive, preferentially transmissive and directionally transmissive elements in accordance with the present invention may be incorporated in various vehicle locations in addition to interior rearview mirror assemblies including, outside rearview mirrors, sun visors, instrument panels, dash boards, overhead consoles, radio displays, heating controls, air conditioner controls, defroster controls, defogger controls, seat backs, consoles between seats, and the like.

Figure 2:
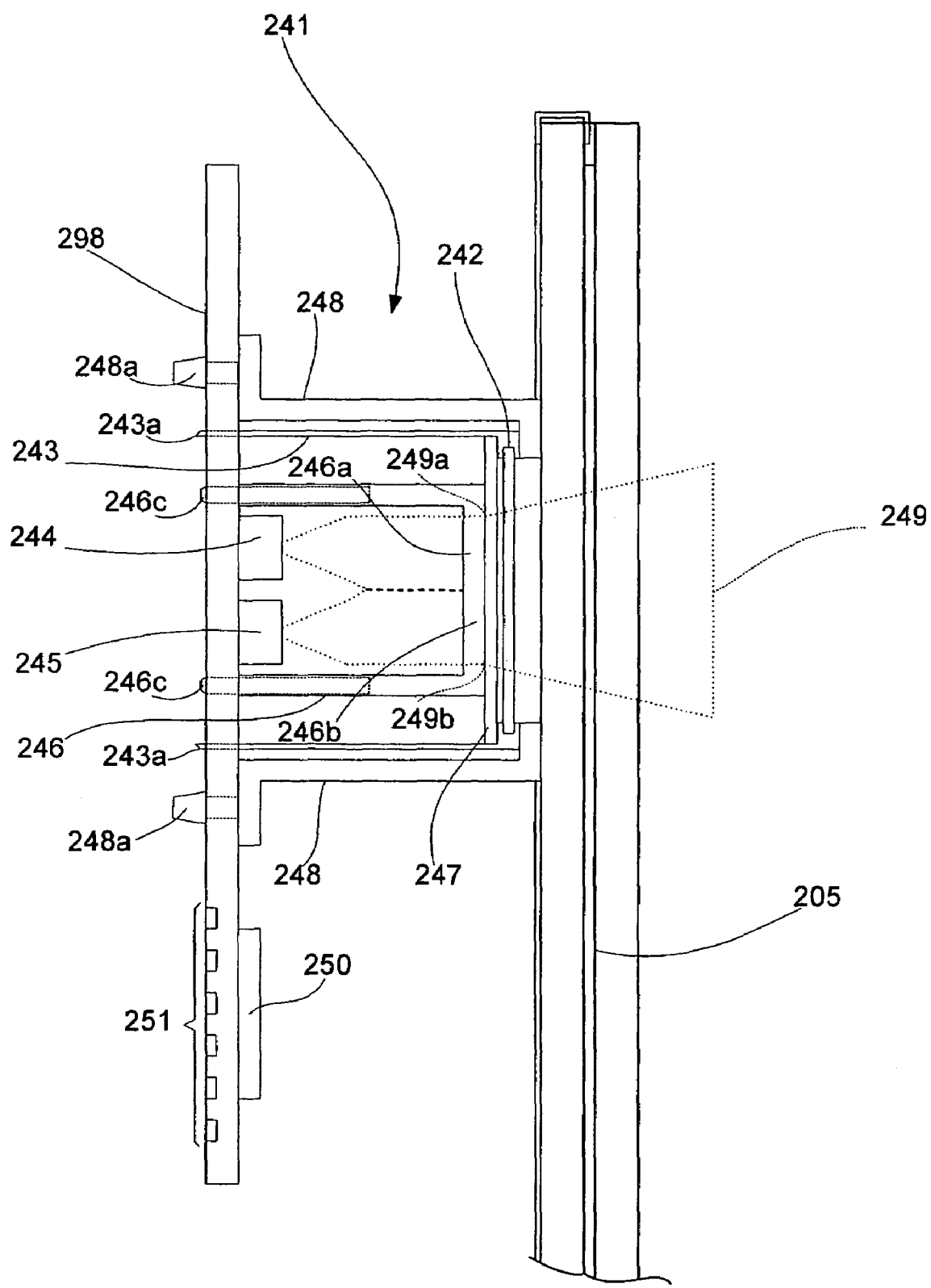
FIG. 2 depicts a detail sectional view of one embodiment of an information display in relation to an associated element.

Turning now to FIG. 2, there is shown an information display 241, mounted to a daughter board 298, in relation to an element 205. In one preferred embodiment, the element 205 comprises a transflective coating such as described in commonly assigned U.S. Pat. Nos. 6,512,624 and 6,356,376, as well as, commonly assigned U.S. Patent Applications 2002/015439 and 2002/0080463, the disclosures of which are incorporated in their entireties herein by reference. Details of one preferred transflective element are discussed with regard to FIG. 3 herein. Utilizing a transflective, reflective element, provides the ability to position the information display(s) behind the reflective element, with respect to the viewer, such that the information display(s) are substantially invisible when not illuminated. The operation and visibility of the information displays and the details associated with the element are described herein.

With further reference to FIG. 2, the information display 241 preferably incorporates a liquid crystal display (LCD) 242 position behind the element 205 with respect to a viewer. The preferred LCD is a negative mode LCD based on the TN or MTN technology as available from Optrex Corporation, Arakawa-ku, Tokyo, Japan. This LCD display is preferable for incorporation with information displays that emit light rays predominantly in the red spectrum. Preferably the principle axis of the LCD is optimized as a function of the position of the information display with respect to an anticipated viewer. With regard to an information display in an inside rearview mirror of a vehicle, where it is desirable for both the driver and the passenger to see the display, the principle axis is preferably oriented normal to the viewing surface of the LCD. As further depicted in FIG. 2, the information display 241 is preferably mounted to a daughter board 298 with the LCD lead frame 243 extending through the board 298 and soldered thereto. It should be understood that displays for use within a broad spectral band are available and within the scope of the present invention and that displays optimized for other spectral bands; such as green, yellow, blue, blue/green, amber, orange, white, etc.; may be selected for alternate embodiments of the present invention.

In one preferred embodiment of an information display, the height of the individual alphanumeric characters is between approximately 4.0 mm and approximately 8.0 mm, more preferably between approximately 4.84 mm and approximately 7.6 mm and most preferably either approximately 4.84 mm, approximately 5.76 mm or approximately 7.6 mm.

In at least one preferred embodiment, the contrast of each character in relation to the background will preferably be between approximately 2:1 to approximately 10:1, more preferably between approximately 3:1 and 8:1, and most preferably 7:1. The contrast may be a function of an ambient sensor, a glare sensor, a sky sensor or a function of any combination of these three sensors. Additionally, the contrast may be a function of the reflectivity of a self dimming reflective element.

In at least one embodiment of an information display, a combination of upper and lower case characters is used. In a preferred embodiment, the characters have font selected from either a Hazeltine, Leroy, Lincoln-mitre, Huddleston, or selected from a list of many Modern Gothic fonts or any other font such as simplistic, Arial, century gothic, courier, etc.

In one preferred embodiment, the information displayed on a given information display will be audibly annunciated over the vehicle speaker simultaneously. It should be understood that any of the information described herein as being displayed may be audibly presented as well.

With further reference to FIG. 2, first and second information display backlighting 244, 245, is preferably mounted to the daughter board 298 such that light rays emitted from the backlighting is projected through an optics block 246, through a diffuser 247, through the LCD 242 and finally through the element 205. Preferably, each information display backlight 244, 245 has a corresponding lens 246a, 246b, respectively. Each lens can be positively spheric, negatively spheric, positively aspheric, negatively aspheric, fresnel, complex, totally internal reflectance (TIR) or any other structure that redirects light rays emitted by the backlights 244, 245, including combinations of the various lens structures. Preferably each lens is catadioptric with a combination of a reflector and refractor.

With additional reference to FIGS. 2a, 2b, and 2c, a preferred optics block 246 is shown to include six individual lenses (two of which are labeled 246a, 246b) and three mounting structures 246c. Preferably, each lens 246a, 246b comprises a center negative refractive portion 246e with a total internal reflectance (TIR) portion 246d encircling the negative refractive portion. Optionally the refractive portion may be positive refractive as shown with dashed line 246f. In a preferred embodiment of an information display in accordance with the present invention, the display is positioned inside of a rearview mirror housing with limited space availability. Therefore, the focal length is constrained with respect to the aperture area associated with each LCD character. The combined negative refractive portion and TIR portion lens is especially suited for such an application and results in redirected a large portion of the light rays emitted from an associated backlight toward the given character. It should be understood that other lens structures are suited for applications not restricted in focal length. In a preferred embodiment, each lens is configured to have a negative refractive portion that encompasses an area associated with light rays emitted at approximately 40° angles with respect to the center of an associated backlight, beyond approximately 40°, the lens comprises TIR characteristics.

With further reference to FIGS. 2, 2a, 2b and 2c, the mounting structures 246c preferable comprise a metallic portion that is interference fit into the optics block and into receptacles in the associated circuit board. This preferred structure is especially suited for applications where the associated information display will be subject to high vibration such as inside of rearview mirror assemblies of motor vehicles.

Preferably, each information display backlight is a surface mount light emitting diode (LED), part number LSE67B, available from OSRAM Opto Semiconductors GmbH, Regensburg, Germany. In a most preferred embodiment, the information display emits red light with a predominant wavelength of substantially 630 nm. Preferably, the LCD is optimize to operate with the predominant wavelength of light rays emitted by the associated back lighting. It should be understood that the backlighting may be incandescent, light emitting polymers, light emitting plasma, organic LEDs, gas discharge elements, etc., in lieu of LEDs.

As further shown in FIG. 2, a boot 248 is preferably positioned to surround each character of the information display 241 to contain the light rays emitted by the backlighting 244, 245 from illuminating other than an associated LCD character. Preferably, boot 248 is mounted to the associated board with tabs 248a extending there through. It should be understood that the associated boot may surround the entire information display and not separate individual characters and the boot may be omitted all together. In one embodiment, the associated board is coated with a reflective coating in the area below the optics block within the boot to enhance directing light rays toward the information display.

With further reference to FIG. 2, the optics block 246 is positioned between the backlighting 244, 245 and the diffuser 247. In a preferred embodiment, the optics block 246 comprises a plurality of lenses 246a, 246b associated with each LCD character such that each backlight has a corresponding lens. The individual lenses are position proximate the associated backlight to redirect the corresponding light rays toward the diffuser substantially uniformly across an associated surface and such that the light rays impinge upon the diffuser substantially perpendicular to the surface of the diffuser on the opposite side of the diffuser from the associated LCD character as depicted by dashed lines 249. It should be understood that a single lens may be used for each character or a single lens for all characters, in lieu of one lens per backlight, without deviating from the scope of the present invention. In one embodiment, the individual backlights are provided with an integral lens; in such an embodiment, the optics block is optional. In another embodiment there are no lenses or optics block. In another embodiment the diffuser is omitted, therefore, the light rays emitted by the backlighting and as redirected by any lens, impinge upon the associated display substantially perpendicular.

With further reference to FIG. 2, the diffuser 247 is preferably place between the LCD 242 and the optics block 246. In a preferred embodiment, the diffuser is a 95°×35°, full width half max (FWHM), holographic, elliptical, diffuser as manufactured by Physical Optics Corporation, Torrance, Calif. The preferred diffuser 247 functions to provide a relatively wide viewing angle in the horizontal direction (viewing angle from the driver's side to the passenger side of a vehicle with regard to an inside rearview mirror embodiment) and a relatively narrow vertical viewing angle. This configuration provides both the driver and the passenger with visual access to the information display. As shown in FIG. 2, light rays emitted by the backlighting preferably impinge upon the diffuser surface defined by 249a, 249b substantially perpendicular and are redirected by the diffuser as shown with reference to dashed lines 249 to produce the desired viewing angle.

It should be understood that the diffuser may be selected such that the light rays emitted by the backlighting may be redirected in a predetermined direction as a function of the position of the information display in relation to an anticipated viewer and/or as a function of the angle of the plane defined by 249a, 249b with respect to a viewing angle of an anticipated viewer. In at least one embodiment, the preferred diffuser is a structured, holographic, elliptical, stereographic, diffuser that enhances efficiency of the information display emitted light ray distribution with respect to anticipated viewers, enhances high end luminance, reduces light ray scatter, and/or enhances contrast.

Preferably, the diffuser also functions to disperse any "hot" spots of concentrated light rays emitted by the backlights. The preferred diffuser functions to retain a focused character while providing an acceptable viewing angle for the information display. In one embodiment, the diffuser is formed as an integral part of the optics block. It should be understood that any combination of backlighting, optics, diffuser and display that produces a substantially focused character while providing a desired viewing angle is within the scope of the present invention. In an alternate embodiment, the diffuser is positioned between the LCD and an associated element. In yet another embodiment there is no diffuser.

With further reference to FIG. 2, the information display 241 preferably includes a display driver 250 and an input/output bus 251. In a preferred embodiment, control signals are received by the display driver 250 from a controller (shown as element 796 in FIG. 7) over an input/output bus 251. Preferably, the display driver is mounted to a daughter board 298 and the controller is mounted to a circuit board (shown as element 795 in FIG. 7). A preferred display driver is part number PCF2112CT available from Philips Semiconductors, 5600 MD Eindhoven, The Netherlands. It should be understood that the controller can be located at any location within the associated vehicle, such as under the dash, in the engine compartment, in an accessory module, in the trunk, in a console, etc.

In a preferred embodiment, the controller transmits signals over the input/output bus 251 to the display driver 250 that manipulate the individual characters as well as the corresponding backlighting. Preferably, the display driver is capable of controlling a larger number of characters than the given information display comprises. Therefore, the spare display driver outputs are available to manipulate the backlighting as a function of the control signal received by the display driver from the controller over the input/output bus. It should be understood that additional control signals, beyond the input/output bus, may be provided from the controller to the information display to separately control the backlighting. Alternately, the backlighting may remain illuminated irrespective of the individual character state.

It should be understood that the display 241 with related components that are shown to be mounted to a daughter board in FIG. 2 may be incorporated with other components on one circuit board, such as the circuit board 795 shown in FIG. 7. The input/output bus may be serial, parallel or any other communication standard, such as blue tooth or CAN bus, and may be eight bit, sixteen bit, thirty-two bit, or any other accepted format. Preferably, a quad x-or gate, part number 74HC86, is incorporated into the information display 214 such that the square wave signals that are out of phase to drive the LCD characters are reoriented to drive the corresponding backlighting. In a most preferred embodiment, the signal transmitted from the controller to the display driver has a 32 bit structure.

In a preferred embodiment, the LCD has three characters as depicted in display areas 122, 140 of FIG. 1. In one embodiment, each LCD character has two backlights associated therewith. Most preferably, boot 248 is configured to substantially prevent light rays from the backlighting associated with a given character from impinging upon another character or any other device external to the information display.

In one embodiment, the information display is configured to provide a visual indication of the compass heading of an associated vehicle. In the preferred compass display, the information display has two individual characters. In operation, one character displays either an "N" (for North) or a "S" (for South), the second character displays either an "E" (for East) or a "W" (for West); when the heading is North-West, for example, both the N and the W would be illuminated. In a preferred embodiment, each LCD character has two backlights, with a total of four backlights in the two character LCD compass display. In a situation where the vehicle heading is either "N", "S", "E" or "W", only the two backlights associated with the given character are illuminated; the backlights associated with the other character are not illuminated. When both characters are utilized, such as "NW" for example, all four backlights are illuminated. Utilizing "character specific" backlighting as described enhances the overall appearance of the information display and results in the unused LCD character being substantially invisible. It should be understood that each character can display any alphanumeric character such as a "C" (for calibrate), "Z" (for zone) and the two can combine to display a number ranging from 0–99.

In one embodiment, a third character is added to the information display, as depicted in FIG. 1, to provide indication as to when the associated compass is in calibration mode or a zone select mode. Preferably, the third character has two additional backlights associated therewith that preferably operate independent of the backlights associated with the other characters. During a zone select mode, for example, two of the characters will combine to display a zone range from 1–15, indicative of the generally accepted fifteen magnetic zones associated with compass readings around the world, and the third character displays a "Z" (indicative of zone select mode). The "CAL" is illuminated to indicate that the associated compass control is in the calibration mode. When positioned behind a transflective, reflective element, of a rearview mirror as in one preferred embodiment, the unused character is substantially invisible to the occupants of the associated vehicle when the associated backlights are not illuminated. As shown in FIG. 1, a portion of the given information display 122 may have characters oriented horizontal and another portion with the characters oriented vertically. It should be understood that some of the characters, or portions thereof, may be different colors from the remainder or each character, or portions thereof, may comprise a plurality of colors.

Preferably, the backlighting of each character is capable of producing between approximately 10,000 and approximately 30,000 candelas per square meter ($cd/m^2$) on the surface of the diffuser or LCD. Most preferably the backlighting of each character is capable of producing approximately 20,000 $cd/m^2$ on the surface of the diffuser or LCD. When used in conjunction with a preferred transflective reflective element, an LCD backlit with approximately 20,000 $cd/m^2$ will result in approximately 1500 $cd/m^2$ output from the first surface of the reflective element.

In a preferred embodiment, the intensity of the backlighting is automatically controlled as a function of an ambient light sensor, a glare light sensor or both the glare light sensor and the ambient sensor. When the information display is positioned behind an automatically dimming element, the display backlighting intensity is preferably a function of the reflectivity of the automatically dimming element in addition to, or in lieu of, the ambient and, or, glare light sensor. The intensity of the backlighting may be incrementally controlled in a series of discrete steps, substantially continuous or a combination thereof as a function of the parameters mentioned above. A daytime intensity function may be different than a night time intensity function. A useful intensity control algorithm is described in commonly assigned U.S. Patent Application publication number 2002/0154379 A1, the disclosure of which is incorporated in its entirety herein by reference.

In a most preferred embodiment, the backlighting will be automatically controlled such that between approximately 250 and approximately 2000 cd/m² is emitted from the first surface of the associated element during day light conditions and between approximately 10 and approximately 200 cd/m² is emitted during dark, or night time, conditions. Most preferably, approximately 1500 cd/m² is emitted from the first surface during day light conditions and approximately 15 cd/m² is emitted during night time conditions.

Although one embodiment has been described to have two backlights per character, one, three or more backlights per character may be provided without deviating from the scope of the present invention. It should be understood that radiation emitters other than LEDs may be used for backlighting, such as, incandescent lights, light emitting polymers, light emitting plasmas and gas discharge lamps. Additionally, through hole LED mounting may be used in lieu of surface mount technology. It should be understood that lighting may be positioned at an edge, or edges of the LCD such that the LCD is sidelit or "light pipes" may be added to redirect the light from the edge to the back. It is within the scope of the present invention to have all backlights operate together irrespective of the state of any given LCD character in lieu of character specific operation. A single backlight could be used to illuminate all the characters. The information display backlighting may be mounted on a side of a circuit board opposite the side of the circuit board the display is mounted with holes through the circuit board aligned with the backlighting such that light rays emitted by the backlighting passes through the associated hole in the circuit board.

One advantage associated with using LCDs, VFDs, dot matrix displays, pixel displays, cathode ray tube displays, LED matrix displays, plasma displays and segmented LED displays is the associated ability to reconfigure the information being displayed via software in a related controller and/or display driver. Utilizing a display driver with excess capacity, as described herein, in combination with a backlit LCD and multicolor backlighting such as red/green/blue, or bluegreen/amber, provides the ability to change color as well as change the actual information. In one embodiment, a reconfigurable display is incorporated with multicolor backlighting to produce a display with the ability to flip, or scroll, through various information as well as having various colors and/or flashing. This embodiment is most applicable to warning type displays; for example low fuel, door ajar, engine over temperature, etc.; wherein the information display is normally not illuminated, or is displaying other information, and then automatically displays the warning information upon the occurrence of a programmed threshold or in response to a sensor input.

Figure 3:
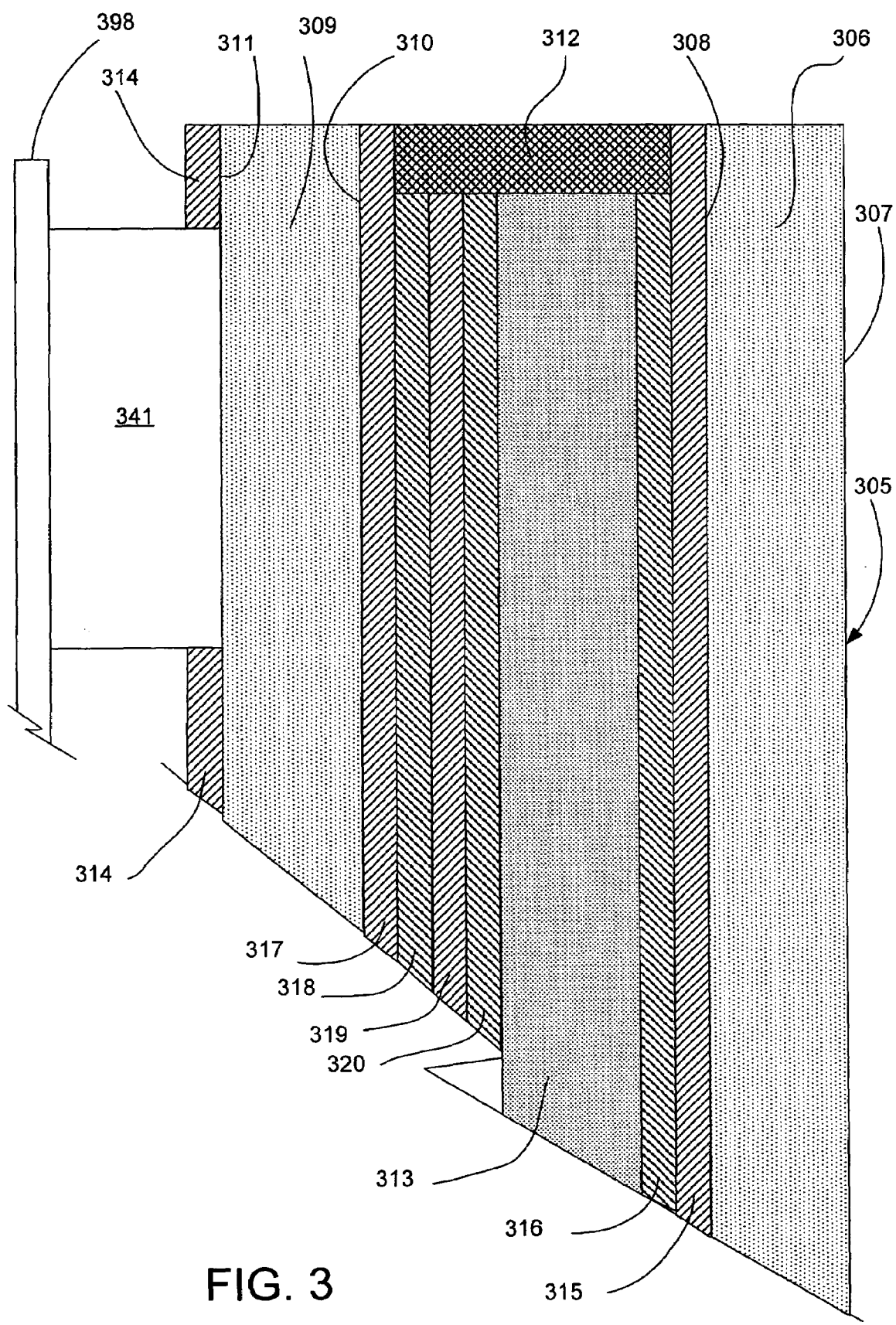
FIG. 3 depicts one embodiment of an information display positioned in relation to an associated element.

Turning now to FIG. 3, an information display 341 mounted to a circuit board 398 is depicted in relation to an element 305. Element 305 is shown to comprise a first substantially transparent substrate 306 and a second substantially transparent substrate 309 in a spaced apart relationship with seal 312 positioned therebetween near the perimeter to define a chamber containing electrochromic medium 313. As further depicted in FIG. 3, first substrate 306 comprises a first surface 307 and a second surface 308. Second surface 308 is coated with a first layer 315 and a second layer 316 of materials to form a substantially transparent electrically conductive coating on the second surface. With further reference to FIG. 3, second substrate 309 is depicted to have a base layer 317, a conductive layer 318, a transflective layer 319 and a flash layer 320 defining a coating on the third surface 310.

In one preferred embodiment, the element 305 comprises a base layer 317 of silicon (Si) that is approximately 120–150 Å, a conductive layer 318 of ITO that is approximately 200–250 Å and a transflective layer 318 of a gold-silver alloy (approximately Ag7%/Au93%) that is approximately 250–300 Å; there is no flash layer 320. Another preferred embodiment has a conductive layer 318 of ITO that is approximately 600–800 Å and a transflective layer 318 of a gold-silver alloy (approximately Ag7%/Au93%) that is approximately 250–300 Å; there is no base layer 317 or flash layer 320. It should be understood that a single layer may be employed or additional layers may be added on third surface 310 without deviated from the scope of the present invention. In another preferred embodiment, the element 305 comprises only a first layer 315 of indium tin oxide (ITO) that is approximately 1500 Å applied to the second surface 308; there is no second layer 316. It should be understood that a single layer may be employed or additional layers may be added on the second surface 308 without deviated from the scope of the present invention. It should be understood that some or all layers may cover substantially the entire associated surface while other layers will not extend to the surface under and/or beyond the associated seal.

The fourth surface 311 of substrate 309 is depicted in FIG. 3 to comprise a substantially opaque material 314 thereon. In a preferred embodiment, material 314 is a substantially opaque shatterproof tape P/N 637-0152 available from Action Fabricators, Kentwood, Mich. A portion of material 314 is removed to define an information display area corresponding to information display 341. It should be understood that a substantially opaque paint, epoxy, or other suitable material may be used for material 314. The substantially opaque material functions to mask portions of the element 305 from transmitting light rays there through other than in the information display area(s). It should be understood that multiple display areas may be defined by removal of additional sections of material 314.

In at least one embodiment, mirror assemblies constructed as described herein, having a backlit LCD located behind a transflective, automatically dimming, reflective element, will have approximately ten percent light loss through the diffuser, approximately seventy-five percent light loss through the LCD and approximately seventy-seven percent light loss through the reflective element. However, in one embodiment a "band pass stack" consisting preferably of dichroic materials is applied to either the third surface 310 or fourth surface 311 to produce a preferentially transmissive element that is matched to the predominant wavelength of light emitted from the corresponding information display and/or associated backlighting. In vehicle applications it is required by regulation to have at least thirty-five percent reflectivity from a rearview mirror and in many cases design criteria dictates a requirement for seventy-five percent reflectivity. Therefore, in a preferred embodiment an element is provided that has between approximately 35 and approximately 75 percent reflectance, preferably 70 percent, with respect to light rays emitted from standard automotive headlights and taillights and approximately 80 to approximately 90 percent transmissivity for the predominant wavelength of light emitted from an associated information display and/or associated backlighting.

It should be understood that any of the layers 317, 318, 319, 320 may be applied to the fourth surface 311 in lieu of, or in addition to, being applied to the third surface 310. In one embodiment, a transflective layer 319 is applied to the fourth surface 311 and then covered with a protective coating of lead base paint to prevent oxidation. The third surface comprises a substantially transparent conductive layer 318. Optionally, the third surface may comprise a base layer 317 and, or, a flash layer 320. It should be understood that this "fourth surface reflector", reflective element, may comprise more or fewer layers in accordance with the scope of the present invention.

In one preferred embodiment, the element comprises transflective light ray transmission characteristics. The preferred transflective, reflective element, is optimized by selecting specific layers 315, 317, 318, 319 to transmit light rays of a predetermined spectral band that is matched to the predominant wavelength of light emitted from the given information display(s). It should be understood that a single layer on the second surface 308 and a single layer on the third surface 310 may be employed or additional layers may be added to either surface without deviating from the scope and spirit of the present invention.

In a preferred embodiment an information display is configured to emit light rays with a predominant wavelength of approximately 630 nm and the element is optimized to transmit wavelengths of approximately 630 nm and/or more in the red spectrum than in the blue spectrum. Certain embodiments may employ reflective elements that have transmission characteristics that are not optimally matched to the given information display. However, in other embodiments the transmission characteristics of the element will be optimized to transmit greenish (approximately 480 to approximately 520 nm), green (approximately 500 nm), bluish (approximately 460 to approximately 480 nm), blue (approximately 475 nm), bluegreen (approximately 485 nm), yellow (approximately 570 nm), yellowish (approximately 520 to 590 nm), white (wavelengths falling substantially on a blackbody curve from approximately 3000 to 20,000), amber light (approximately 580 nm), approximately 380 to approximately 460 nm or approximately 620 to approximately 780 nm.

Transparent electrodes made of ITO or other transparent conductors have been optimized at thicknesses to maximize the transmission of visible light (typically centered around 550 nm). These transmission optimized thicknesses are either very thin layers (<300 Å) or layers optimized at what is commonly called ½ wave, full wave, 1½ wave, etc. thickness. For ITO, the ½ wave thickness is about 1400 Å and the full wave thickness is around 2800 Å. Surprisingly, these thicknesses are not optimum for transflective (i.e., partially transmissive, partially reflective) electrodes with a single underlayer of a transparent conductor under a metal reflector such as silver or silver alloys. The optimum thicknesses to achieve relative color neutrality of reflected light are centered around ¼ wave, ¾ wave, 1¼ wave, etc. optical thicknesses for light of 500 nm wavelength. In other words the optimal optical thickness for such a layer when underlying a metal reflector such as silver or silver alloy is $(m^*\lambda)/4$, where $\lambda$ is the wavelength of light at which the layer is optimized (e.g., 500 nm for example) and m is an odd integer. These optimum thicknesses are ¼ wave different from the transmission optima for the same wavelength. Such a single layer may have a thickness of between 100 Å and 3500 Å and more preferably between 200 Å and 250 Å, and a sheet resistivity of between about 3Ω/□ and 300Ω/□ and preferably less than about 100Ω/□.

Referring again to FIG. 3, a chamber, as defined by the first substantially transparent substrate 306, the second substantially transparent substrate 309 and an inner circumferential wall of seal 312, contains an electrochromic medium 313. Electrochromic medium 313 is preferably capable of selectively attenuating light traveling there through and preferably has at least one solution-phase electrochromic material and preferably at least one additional electroactive material that may be solution-phase, surface-confined, or one that plates out onto a surface. However, the presently preferred media are solution-phase redox electrochromics, such as those disclosed in commonly assigned U.S. Pat. Nos. 4,902,108, 5,128,799, 5,278,693, 5,280,380, 5,282,077, 5,294,376, 5,336,448, 5,808,778 and 6,020,987; the entire disclosures of which are incorporated herein in their entireties by reference. If a solution-phase electrochromic medium is utilized, it may be inserted into the chamber through a sealable fill port through well-known techniques, such as vacuum backfilling and the like.

Electrochromic medium 313 preferably includes electrochromic anodic and cathodic materials that can be grouped into the following categories:

Single layer—the electrochromic medium is a single layer of material which may include small inhomogeneous regions and includes solution-phase devices where a material is contained in solution in the ionically conducting electrolyte and remains in solution in the electrolyte when electrochemically oxidized or reduced. U.S. Pat. No. 6,193,912 entitled "NEAR INFRARED-ABSORBING ELECTROCHROMIC COMPOUNDS AND DEVICES COMPRISING SAME"; U.S. Pat. No. 6,188,505 entitled "COLOR STABILIZED ELECTROCHROMIC DEVICES"; U.S. Pat. No. 6,262,832 entitled "ANODIC ELECTROCHROMIC MATERIALS HAVING A SOLUBLIZING MOIETY"; U.S. Pat. No. 6,137,620 entitled "ELECTROCHROMIC MEDIA WITH CONCENTRATION ENHANCED STABILITY, PROCESS FOR PREPARATION THEREOF AND USE IN ELECTROCHROMIC DEVICES"; U.S. Pat. No. 6,195,192 entitled "ELECTROCHROMIC MATERIALS WITH ENHANCED ULTRAVIOLET STABILITY"; U.S. Pat. No. 6,392,783 entitled "SUBSTITUTED METALLOCENES FOR USE AS AN ANODIC ELECTROCHROMIC MATERIALS AND ELECTROCHROMIC MEDIA AND DEVICES COMPRISING THE SAME"; and U.S. Pat. No. 6,249,369 entitled "COUPLED ELECTROCHROMIC COMPOUNDS WITH PHOTOSTABLE DICATION OXIDATION STATES" disclose anodic and cathodic materials that may be used in a single layer electrochromic medium, the entire disclosures of which are incorporated herein by reference. Solution-phase electroactive materials may be contained in the continuous solution phase of a cross-linked polymer matrix in accordance with the teachings of U.S. Pat. No. 5,928,572, entitled "ELECTROCHROMIC LAYER AND DEVICES COMPRISING SAME" or International Patent Application No. PCT/US98/05570 entitled "ELECTROCHROMIC POLYMERIC SOLID FILMS, MANUFACTURING ELECTROCHROMIC DEVICES USING SUCH SOLID FILMS, AND PROCESSES FOR MAKING SUCH SOLID FILMS AND DEVICES," the entire disclosures of which are incorporated herein by reference.

At least three electroactive materials, at least two of which are electrochromic, can be combined to give a pre-selected color as described in U.S. Pat. No. 6,020,987 entitled "ELECTROCHROMIC MEDIUM CAPABLE OF PRODUCING A PRE-SELECTED COLOR," the entire disclosure of which is incorporated herein by reference. This ability to select the color of the electrochromic medium is particularly advantageous when designing information displays with associated elements.

The anodic and cathodic materials can be combined or linked by a bridging unit as described in International Application No. PCT/WO97/EP498 entitled "ELECTROCHROMIC SYSTEM," the entire disclosure of which is incorporated herein by reference. It is also possible to link anodic materials or cathodic materials by similar methods. The concepts described in these applications can further be combined to yield a variety of electrochromic materials that are linked.

Additionally, a single layer medium includes the medium where the anodic and cathodic materials can be incorporated into the polymer matrix as described in International Application No. PCT/WO98/EP3862 entitled "ELECTROCHROMIC POLYMER SYSTEM," U.S. Pat. No. 6,002,511, or International Patent Application No. PCT/US98/05570 entitled "ELECTROCHROMIC POLYMERIC SOLID FILMS, MANUFACTURING ELECTROCHROMIC DEVICES USING SUCH SOLID FILMS, AND PROCESSES FOR MAKING SUCH SOLID FILMS AND DEVICES," the entire disclosures of which are incorporated herein by reference.

Also included is a medium where one or more materials in the medium undergoes a change in phase during the operation of the device, for example, a deposition system where a material contained in solution in the ionically conducting electrolyte which forms a layer, or partial layer on the electronically conducting electrode when electrochemically oxidized or reduced.

Multilayer—the medium is made up in layers and includes at least one material attached directly to an electronically conducting electrode or confined in close proximity thereto which remains attached or confined when electrochemically oxidized or reduced. Examples of this type of electrochromic medium are the metal oxide films, such as tungsten oxide, iridium oxide, nickel oxide, and vanadium oxide. A medium, which contains one or more organic electrochromic layers, such as polythiophene, polyaniline, or polypyrrole attached to the electrode, would also be considered a multilayer medium.

In addition, the electrochromic medium may also contain other materials, such as light absorbers, light stabilizers, thermal stabilizers, antioxidants, thickeners, or viscosity modifiers.

It may be desirable to incorporate a gel into the electrochromic device as disclosed in commonly assigned U.S. Pat. No. 5,940,201 entitled "AN ELECTROCHROMIC MIRROR WITH TWO THIN GLASS ELEMENTS AND A GELLED ELECTROCHROMIC MEDIUM," filed on Apr. 2, 1997. The entire disclosure of this U.S. patent is incorporated herein by reference.

First and second substantially transparent substrates 306 and 309 may be any material which is transparent and has sufficient strength to be able to operate in the environmental conditions to which the device will be exposed. Substrates 306 and 309 may comprise any type of borosilicate glass, soda lime glass, float glass, or any other material, such as, for example, MYLAR®, polyvinylidene chloride, polyvinylidene halides, such as polyvinylidene fluoride, a polymer or plastic, such as cyclic olefin copolymers like Topas® available from Ticona, LLC of Summitt, N.J., that is transparent in the visible region of the electromagnetic spectrum. Elements 28 and 30 are preferably made from sheets of glass.

Additionally, substrates 306 and 309 may be treated or coated as is described in U.S. Pat. No. 6,239,898 entitled "ELECTROCHROMIC STRUCTURES," U.S. Pat. No. 6,193,378 entitled "AN ELECTROCHROMIC DEVICE HAVING A SELF-CLEANING HYDROPHILIC COATING," and U.S. patent application Ser. No. 09/602,919 entitled "AN ELECTRO-OPTIC DEVICE HAVING A SELF-CLEANING HYDROPHILIC COATING," filed on Jun. 23, 2000, the entire disclosures of which are incorporated herein by reference. Other treatments, such as antireflectance coatings, hydrophilic coatings, low-E coatings, and UV-blocking layers are also envisioned. Also, such coatings may be applied to elements 28 and 30 in this and other embodiments.

Commonly assigned U.S. Pat. Nos. 5,940,201, 6,193,379, 6,195,194, 6,246,507, and U.S. patent application Ser. No. 10/260,741, the disclosures of which are incorporated in their entireties herein by reference, describe a host of reflective elements for use with the present invention. It should be understood that the specific reflective element configuration as depicted in FIG. 2 is one embodiment and that a plurality of embodiments are disclosed herein and in the references incorporated herein by reference.

Suitable materials for use as layers 315, 316, 317, 318, 319, and 320 are disclosed in commonly assigned U.S. Pat. Nos. 6,356,376 and 6,512,624, as well as, U.S. Patent applications 2002/0080463 and 2002/0154379; the disclosures of which are incorporated in their entireties herein by reference.

In at least one preferred embodiment, the element is designed to be preferentially transmissive with regard to a narrow band of wavelengths of light. U.S. Pat. Nos. 5,619,375, 5,619,374, 5,528,422, 5,481,409, D363,920, 5,361,190, 5,355,284, 5,207,492, 5,128,659, 5,014,167 and 5,005,009, the disclosures of which are incorporated herein in their entireties by reference, describe a host of single band pass elements for use with the present invention.

Preferably, the element is designed to be preferentially transmissive with regard to more than one narrow band of wavelengths of light. In one embodiment, an element comprises twelve layers of materials is provided. The first layer is titanium-oxide ($TiO_2$) approximately 599 Å thick, the second layer is silicon-oxide ($SiO_2$) approximately 1066 Å thick, the third layer is titanium-oxide ($TiO_2$) approximately 235 Å thick, the fourth layer is silicon-oxide ($SiO_2$) approximately 262 Å thick, the fifth layer is titanium-oxide ($TiO_2$) approximately 1560 Å thick, the sixth layer is silicon-oxide ($SiO_2$) approximately 727 Å thick, the seventh layer is titanium-oxide ($TiO_2$) approximately 487 Å thick, the eighth layer is silicon-oxide ($SiO_2$) approximately 926 Å thick, the ninth layer is titanium-oxide ($TiO_2$) approximately 546 Å thick, the tenth layer is silicon-oxide ($SiO_2$) approximately 1625 Å thick, the eleventh layer is titanium-oxide ($TiO_2$) approximately 892 Å thick, and the twelve layer is silicon-oxide ($SiO_2$) approximately 985 Å thick. This stack of layers is optimized to transmit two narrow bands of light ray wavelengths, the first at approximately 490 nm (Blue-Green spectrum) and the second at approximately 655 nm (Amber spectrum). Preferably, this dichroic stack is applied to the fourth surface 311 of element 305, however, it should be understood that a layer 320 of a substantially transparent conductive material may be applied as a thirteenth layer and the stack may be applied to the third surface 310. Also, it should be understood that this stack may be applied to an element comprising a single substantially transparent substrate on either the first or second surface 307, 308, respectively.

In another embodiment, an element comprises fourteen layers of materials is provided. The first layer is titanium-oxide (TiO$_2$) approximately 345 Å thick, the second layer is silicon-oxide (SiO$_2$) approximately 979 Å thick, the third layer is titanium-oxide (TiO$_2$) approximately 485 Å thick, the fourth layer is silicon-oxide (SiO$_2$) approximately 837 Å thick, the fifth layer is titanium-oxide (TiO$_2$) approximately 2070 Å thick, the sixth layer is silicon-oxide (SiO$_2$) approximately 760 Å thick, the seventh layer is titanium-oxide (TiO$_2$) approximately 392 Å thick, the eighth layer is silicon-oxide (SiO$_2$) approximately 483 Å thick, the ninth layer is titanium-oxide (TiO$_2$) approximately 356 Å thick, the tenth layer is silicon-oxide (SiO$_2$) approximately 2620 Å thick, the eleventh layer is titanium-oxide (TiO$_2$) approximately 767 Å thick, the twelve layer is silicon-oxide (SiO$_2$) approximately 1460 Å thick, the thirteenth layer is titanium-oxide (TiO$_2$) approximately 509 Å thick and the fourteenth layer is silicon-oxide (SiO$_2$) approximately 905 Å thick. This stack of layers is optimized to transmit three narrow bands of light ray wavelengths, the first at approximately 465 nm (Blue spectrum), the second at approximately 545 nm (Green spectrum) and the third at approximately 655 nm (Red spectrum). Preferably, this dichroic stack is applied to the fourth surface 311 of element 305, however, it should be understood that a layer 320 of a substantially transparent conductive material may be applied as a fifteenth layer and the stack may be applied to the third surface 310. Also, it should be understood that this stack may be applied to an element comprising a single substantially transparent substrate on either the first or second surface 307, 308, respectively.

In yet another embodiment, a six layer stack of materials is provided comprising a first layer of titanium-oxide (TiO$_2$) approximately 600 Å thick, a second layer of Silver (Ag) approximately 27945 Å thick, a third layer of titanium-oxide (TiO$_2$) approximately 235 Å thick, a fourth layer of Silver (Ag) approximately 6870 Å thick, a fifth layer of titanium-oxide (TiO$_2$) approximately 1560 Å thick and a sixth layer of Silver (Ag) approximately 19063 Å thick. This stack of layers is optimized to transmit three narrow bands of light ray wavelengths, the first at approximately 490 nm (Blue spectrum), the second at approximately 550 nm (Green spectrum) and the third at approximately 655 nm (Red spectrum). It should be understood that this stack may be applied to the third of fourth surface 310, 311, respectively, of element 305. Also, it should be understood that this stack may be applied to an element comprising a single substantially transparent substrate on either the first or second surface 307, 308, respectively.

An advantage of applying a stack to an element that is preferentially transmissive in two or three narrow bands, especially in the R/G/B or Amber/Blue-Green combinations, is that the individual narrow bands of light ray wavelengths may be transmitted to create a substantially white light appearance. Therefore, the described stacks function to transmit white light, as well as, reflect white light. In a related embodiment of an information display, the associated emitted light rays will be associated with one or more of the transmissive bands of the element.

In related embodiments, a high transmission of light may be transmitted while providing a high reflectivity. In one embodiment, a white light information display is provided by emitting either R/G/B or Amber/Blue-Green light, and the element will have a high broad band reflection characteristic. These embodiments are especially useful for vehicle rearview mirrors. It should be understood that other combinations of narrow band transmitting elements are within the scope of the present invention.

It should be understood that preferentially absorptive materials, such as iron-oxides, may be incorporated with any of the above stacks to enhance the overall transmission, reflection and ghosting preventive characteristics of a given element.

Because many light emitting displays, such as a vacuum fluorescent display with a glass top plate, an LCD, or any other display assembly mounted such that there is an air gap between surface 311 and the front surface of display 314, typically include at least one specular surface, light reflected back at the specular surface(s) of display 314 is reflected off the specular surface back through the associated element 305, transflective layer 319, electrochromic medium 313, layers 315, 316, 317, 318 and 320, and element 305. This spurious reflection off of the specular surface of display 314 thus creates a ghost image that is viewable by the vehicle occupants. Additional spurious reflections occur at the outer surface 307 of element 305 due to the differences in refractive indices of element 305 and the air surrounding the element. Thus, light rays are reflected back into the mirror from surface 308 and is subsequently reflected off of transflective layer 319 back though medium 313, layers 315, 316, 317, 318 and 320, and element 305. It is therefore desirable to implement various measures that eliminate or reduce the intensity of these spurious reflections and thereby eliminate the annoying ghost images that are visible to the vehicle occupants. Various modifications that may be made to reduce these spurious reflections. It should be noted that these spurious reflections are always lower in brightness than the nonreflected image.

One approach to improving the clarity of the display without eliminating spurious reflections is to control the display brightness such that the intensity of the secondary images are below the visual perception threshold. This brightness level will vary with ambient light levels. The ambient light levels can be accurately determined by light sensors in the mirror. This feedback can be used to adjust the information display and/or backlighting intensity so the secondary images are not bright enough to be objectionable. Anti-reflective means may be provided for reducing or preventing reflections from the specular surface and front surface 307 of element 305, may include an anti-reflective film applied to the rear surface of element 305 or to any and all specularly reflecting surfaces of display assembly 341. Anti-reflective means may also include a light absorbing mask applied to rear surface 311 or specular the surface of display assembly 341. Such a masking layer may be made to cover substantially the entirety of the specular surface, with the exception of those regions lying directly over a light emitting segment of display 341. The masking may be made with any light absorbing material, such as black paint, black tape, black foam backing, or the like. It should be noted that vacuum florescent displays are available with an internal black mask in all areas around the individual light emitting elements. If the anti-reflective means is formed as an anti-reflective layer, substantially any known anti-reflective film may be employed for this purpose. The anti-reflective film need only be constructed to prevent reflections at the particular wavelength of the light emitted from display 341.

By providing anti-reflective means as described above, any light that is reflected back from transflective layer 319 toward the specular surface of display 341 is either absorbed or transmitted into display 341, such that it cannot be reflected from the specular surface through the element towards the eyes of the vehicle occupants. It should be noted that anti-reflective means may also include any other structure capable of reducing or preventing the reflection of light from the specular surface. Further, the anti-reflective means may include a combination of an anti-reflective film and a masking layer and may be incorporated on any specularly reflective surface that could reflect light reflected off an associated reflector, for example, either the back surface of substrate 309, the front surface of display 341, or any internal surface in display 341.

To reduce the spurious reflections from the air interface with surface 311 of element 305, an anti-reflective film may be provided on surface 311. The anti-reflective film may be formed of any conventional structure. A circular polarizer inserted between the transflective coating and the display is also useful in reducing spurious reflections.

An alternative solution to the problems relating to the reflection of light from display 341 off of transflective layer 319 and the specular surface of the display is that display 314 is preferably selected from those displays that do not include any form of specular surface. Examples of such displays are available from Hewlett Packard and are referenced as the HDSP Series. Such displays generally have a front surface that is substantially light absorbing, such that little if any light would be reflected off the forward-facing surface of the display.

Another example of a display construction that would not have a specularly reflecting surface (such as between glass and air) would be a back lit liquid crystal display (LCD) that is laminated directly onto the back surface of the element 311 to eliminate the air gap or air interface between the display and the element. Eliminating the air gap is an effective means of minimizing the first surface reflection of all display devices. If the type of LCD used was normally opaque or dark such as with a twisted nematic LCD with parallel polarizers or a phase change or guest host LCD with a black dye, the reflected light would be absorbed by the display and not re-reflected back toward the viewer. Another approach would be to use a back lit transmissive twisted nematic LCD with crossed polarizers. The entire display area would then be illuminated and contrasted with black digits. Alternatively, a positive or negative contrast electrochromic display could be used in place of the LCD, or an organic LED could be laminated or fixed to the back surface of an element.

An alternative solution is whereby display 341 is mounted in back of rear surface 311 of element 305, such that the specular surface is inclined at an angle to rear surface 311. If the angle of the display is great enough, the beam could be directed toward an absorbing surface such as a black mask applied to the back of a mirror. It should be noted that, rather than angling the display, the reflected beam could be deflected by some other means such as by laminating a transparent wedge shape on the front of the display, the goal being to redirect the reflected light out of the viewing cone of the display or to an absorbing media or surface.

Another useful technique to reduce spurious reflections is to reflect the display image off of a mirror surface (preferably a first surface mirror) at about a 45.degree. angle and then through the transflective layer 319. The image reflected off the transflective layer 319 can then be redirected away from the specular surfaces on the display by slightly angling the relationship of the display to the transflective layer.

Yet another approach for overcoming the problems noted above overcomes the problem by actually mounting the display in front of transflective layer 319. To enable the display to be mounted in front of the reflected layer, a substantially transparent display, such as an organic light emitting diode (OLED) is utilized. OLEDs are available from Universal Display Corporation. Such OLEDs can be constructed such that they are thin transparent displays that could be mounted inside the chamber in which the electrochromic medium is maintained. Because OLED can be transparent, it would not interfere with the image viewed by the driver of the vehicle. Additionally, by providing OLED inside the chamber between the substrates, display is protected from any adverse environmental effects. Thus, such an arrangement is particularly desirable when mounting a display device in an exterior automotive rearview mirror. Preferably, the OLED display is mounted in front of transflective layer 319 in the chamber between substrates 306 and 309.

It should be understood that any interfacing surface of a given component of an information display may comprise an anti-reflective coating or the surfaces themselves may comprise anti-reflective textures. In a preferred embodiment, each surface of the diffuser, the LCD, the element and each layer with the element, or any subcombination thereof, may comprise anti-reflective materials or surface texture.

Many mirrors are sold each year which have the added feature of displaying the heading of a vehicle using an alpha-numeric Vacuum Fluorescent Display (VFD) capable of displaying eight compass directions (N, S, E, W, NW, SW, NE, SE). These types of displays are used in many other applications in motor vehicles such as radios and clocks. These displays have a glass cover over the phosphor digit segments. When used with a transflective mirror, the majority of the light from the VFD is not transmitted through the mirror but reflected back to the display. A portion of this reflected light is then reflected off both the top and bottom surfaces of the cover glass of the VFD and back through the mirror. These multi-bounce reflections result is ghost or double images in the display which are highly undesired. As discussed above, a solution to this problem is to provide an anti-reflection coating on the cover glass of the VFD, however, such an anti-reflection coating adds to the cost of the display. Other disadvantages of VFD displays is that they are expensive and fragile.

A segmented LED alpha-numeric display is a viable alternative to a vacuum fluorescent display or LCD for use in a transflective mirror as a reconfigurable display. As discussed above, segmented LED displays do not have a specular cover glass and thus do not suffer from ghost reflection problems. Additionally, the area surrounding the LED segments can be colored black to further aid in suppressing spurious reflections. LED displays also have the advantage of having extremely high reliability and long life. Segmented alpha-numeric LED displays are commercially available but are complicated to manufacture and it is difficult to maintain segment to segment brightness and color consistency. Finally, it is also difficult to prevent light from one segment from bleeding into another segment. Segmented LED displays are also only available in saturated highly monochromatic colors, with the exception of some phosphor-LED combinations, may be used in accordance with the present invention. Many automotive manufacturers have display color schemes which are more broad spectrum and difficult, if not impossible to match with LED technologies. Most cars manufactured in the United States have a blue display color scheme, which could only be matched with blue LEDs may be used in accordance with the present invention.

LEDs may be light emitting polymers, organic LEDs or may be of the type trade named "Pixar" by Hewlett Packard. Due to the loss of light in the transflective coating, bright LEDs are needed. AlInGaP based LEDs are suitable for this application and are available in greed, red, amber, and various similar colors. Blue and green colors can be achieved by using InGaN LEDs. Although InGaN LEDs are currently expensive, there are many fewer LEDs needed than would be used in a segmented display. As an alternative to using packaged LEDs such as the "Pixar" LED, they can be bonded to the circuit board directly using a technique commonly known in the industry as Chip-On-Board.

Figure 4:
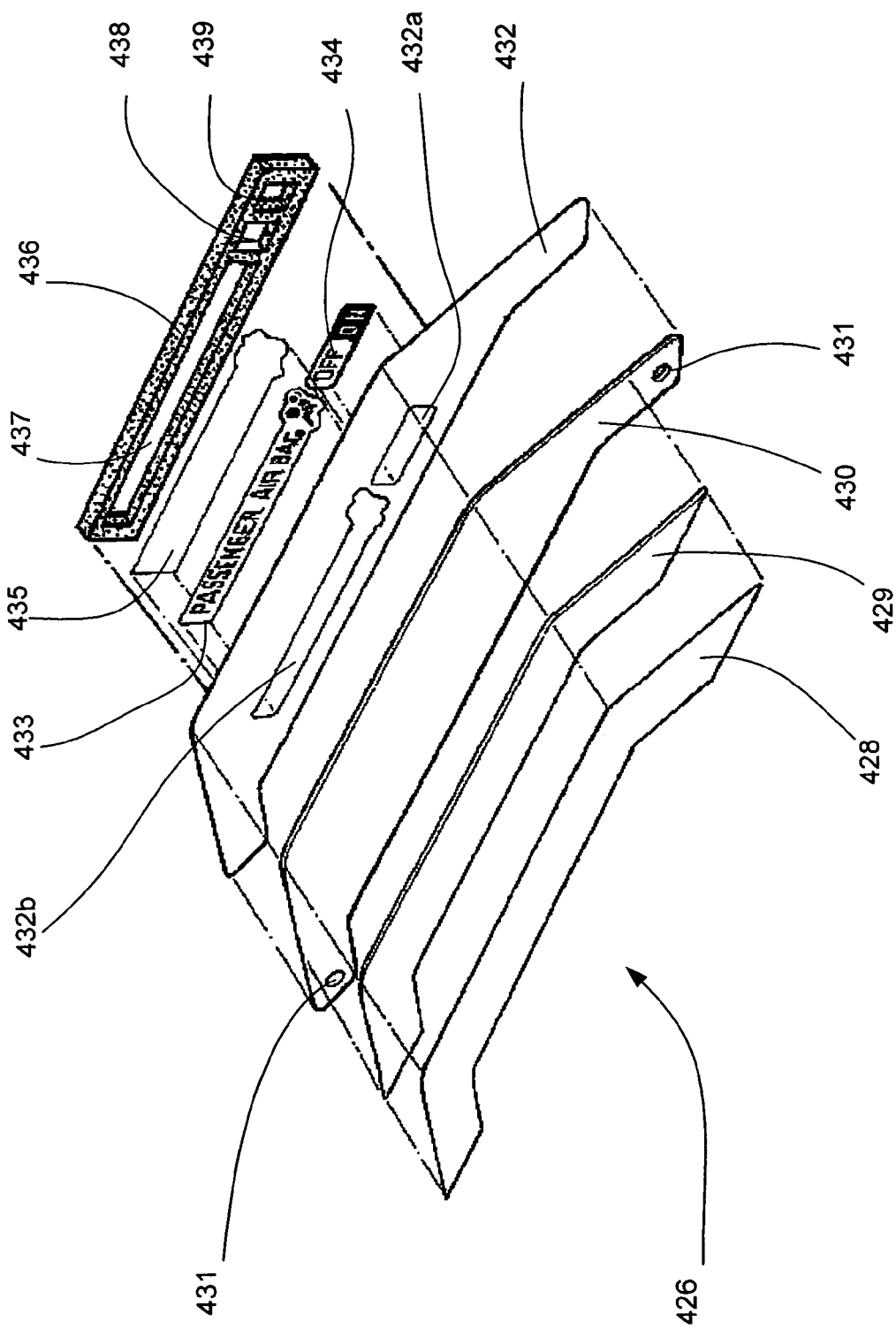
FIG. 4 depicts an exploded view of a second information display embodiment.

Turning now to FIG. 4, there is shown an information display 426 comprising a release paper 428, an adhesive layer 429, a body panel 430 with locator holes 431, a light absorbing layer 432, a first illustration material 433, a second illustration material 434, a translucent or semitransparent material 435 and a light seal 436. The light absorbing layer has first and second openings 432a, 432b. The light seal comprises first, second and third openings 437, 438, 439. With additional reference to FIG. 6, the information display 626 is positioned between the reflective element 605 and the information display backlighting 627 to form a backlit information display. In the embodiment as shown in FIGS. 4, 6 and 7, there are backlight(s) associated with the "PASSENGER AIR BAG," separate backlight(s) associated with the "OFF,"and separate backlight(s) associated with the "ON". The light seal 436 serves to isolate the light rays from the individual separate backlight(s) such that the "PASSENGER AIR BAG" portion, the "OFF" portion, and the "ON" portion can be independently illuminated. It should be understood that in lieu of the indicia shown in FIG. 4, other alphanumeric characters may be incorporated into information display 426. For example, an alternate compass display, as shown in FIG. 1, may be configured such that a series of illustration materials comprise, from left to right, a "S," "SW," "W," "NW," "N," "NE," "E," "SE". A "C" and "Z," along with a series of numbers, can be added to provide the function as described with regard to information display 241. It should be understood that any combination of alphanumeric, graphical, and real time video may be incorporated into a given information display or displays.

Preferably, the display 426 is located near either the top or bottom of an element (shown in FIG. 1 as display areas 121, 125) and substantially centered such that either right hand drive or left hand drive vehicles are accommodated with the same part. Location of the information display in a "linear fashion," near the top or bottom of the associated element, facilitates efficient use of the associated circuit board space due to the fact that the associated information display backlighting can be position near the perimeter of the circuit board. Preferably, backlights are placed behind each of the individual characters such that each may be independently controlled. Preferably LEDs are used for the individual backlights. The LEDs can be top side mounted on an associated circuit board and aimed down through aligned holes in the board. Fairly high intensity LEDs are preferable to provide intensities as described with respect to display 241, emitting toward the viewer, projecting from the first surface of the associated element. Each backlight is preferably directed at a respective character with a light seal isolating light rays directed to a specific character from impinging on any other character. For example, "N" would have an associated backlight (or backlights) and it (they) would be directed at the "N" on the back of the information display.

The information display is preferably positioned proximate the rear surface of the corresponding element, with respect to a viewer, and the backlights are mounted behind the display on a circuit board as shown in FIGS. 6 and 7. Preferably, a standard surface mount LED is used for the display backlighting, however, any of the illuminators disclosed in commonly assigned U.S. Pat. Nos. 5,803,579 and 6,335,548, as well as, U.S. patent application Ser. No. 09/835,278 may be employed; the disclosures of each of these patents are incorporated in their entireties herein by reference. It should be understood that the associated backlights may be mounted to a circuit board common to the circuit board shown as 795 in FIG. 7.

The light seal 436 may be either a plastic part, a rubber molded part or other type of elastimer molded part that fits between the circuit board and the individual characters of the display such that light ray bleed-over is prevented.

The light rays emitted by the corresponding backlighting projects through the element such that a loss of approximately 75% of the light intensity is expected to result with one preferred element. Substantially perfectly focused characters are achieved with the preferred backlit information display. In one preferred embodiment, the characters remain in focus even when viewed from off-axis.

In one compass display embodiment in accordance with information display 426, calibrate mode and zone select is accomplished with separate "C" and "Z" characters as shown in FIG. 1. While in calibrate mode, only the backlighting associated with the "C" is illuminated. In zone select mode, the backlighting associated with the "Z" is illuminated plus a predetermined combination of the remaining individual character backlights are illuminated to represent 1–15. For example, four of the remaining characters can be utilized to represent a binary, twos-compliment, representation of 1–15. Alternatively, a single character, or group of characters, may flash in a predetermined pattern to indicate a given number 1–15. Alternatively, individual numbers may be added to the information display to directly represent the 1–15 zone.

The display 426 color is easily reconfigured simply by changing the backlighting color and, or, the body panel, light absorbing layer or illustration material. Commonly assigned U.S. patent application Ser. No. 09/586,813, the disclosure of which is incorporated in its entirety herein by reference, describes a preferred embodiment of an information display having a material with light absorbing and transmitting characteristics that are matched to the predominant wavelength of light rays emitted by the corresponding backlighting.

The individual characters incorporated in the given information display may be reconfigured simply by changing the associated illustration material. For example, a device intended for use in Germany may have "OST" in lieu of "E". Similarly, provisions for a multilingual information display, for global markets, can be produced by matching the illustration material to the given destination country language. It should be understood that any alphanumeric or graphical characters may be used in accordance with the scope of the present invention.

In a preferred embodiment of the information display 426, the intensity of the backlighting is controlled as a function of a glare sensor, an ambient sensor, the glare and ambient sensor and, or, the reflectance of an associated variable reflectance element as described with regard to the information display 241. The information display 426, when incorporated in a mirror assembly with a transflective, reflective element, will not have the seventy-five percent light loss associated with the LCD as with display 241, therefore, the intensity of the backlighting can be correspondingly reduced to produce the same first surface light emission as described above with regard to information display 241.

In an alternate embodiment of information display 426, a separate lens is positioned proximate each backlight to redirect the associated light rays. Additionally, a diffuser may be place between the display and the element to provide a desired viewing angle as described with regard to display 241. Preferably, the diffuser also functions to prevent "hot spots" associated with any concentrated light rays emitted by the backlights. The diffuser may be configured as an integral portion of the given display.

Various methods of controlling the segments are contemplated. In the simplest form, only one of the LEDs behind the eight compass direction indicators is illuminated at a given time, depending on the direction of travel. In another scheme, all eight indicators are lit dimly and the indicator corresponding to the current direction of travel is lit more brightly than the other eight. In yet another scheme, bicolor LEDs are used and the LED indicator corresponding to the current direction of travel is set to a different color than the other eight. A final alternative would be to have only the indicator corresponding to the current direction of travel lit, but gradually fade from one indicator to another as the car changes directions.

The circuit board is positioned behind the mirror using spacer. The spacer serves multiple purposes. First, the spacer positions the circuit board a distance from the mirror, ¼ inch for example, such that the light from the LED fully covers the indicator. Second, the spacer prevents cross talk between indicators by preventing light from one cavity from entering another cavity. To achieve this, the spacer should be made from a white, highly reflective material. At the least, the spacer must be opaque. Finally, the spacer serves to help reflect light exiting the LED at high angles back towards the indicator. This improves the efficiency of the system. The spacer may even be constructed with a parabolic bowl surrounding the LED to most effectively direct light forward. A lambertian scattering surface on the spacer will also help diffuse the light and improve the uniformity of the indicator illumination. The empty region between the circuit board and the mirror formed by the openings in the spacer may be filled with an epoxy or silicone containing a diffusant. This will help further diffuse the light and help the indicators appear more uniform. An applique is provided in a masking layer made of a thin material which has a black matte mask covering all areas but the graphical indicators. The regions for the graphic are a clear or somewhat white and diffuse. The applique may be formed by silk-screening the black mask pattern onto a film of diffuse plastic. Preferably, the side of the applique facing the LEDs is also screened with a white ink. This will allow light which does not pass through the letters or graphical region to reflect back onto the LED and spacer where it may then partially reflect back forward. Alternatively, the applique can be formed by directly silk screening the black mask onto the back surface of mirror. The manner by which such an applique may be constructed is disclosed in U.S. Pat. No. 6,170,956, entitled "REARVIEW MIRROR DISPLAY," filed on May 13, 1999, by Wayne J. Rumsey et al, the entire disclosure of which is herein incorporated by reference.

Turning now to FIG. 5, a mirror assembly 502 is shown to comprise a bezel 555 and a case 556. The bezel and the case combine to define a mirror housing for incorporation of features in addition to a reflective element and information displays. Commonly assigned U.S. Pat. Nos. 6,102,546, D 410,607, 6,407,468, 6,420,800 and U.S. patent application Ser. No. 09/687,743, the disclosures of which are incorporated in their entireties herein by reference, describe various bezels, cases and associated button construction for use with the present invention.

As depicted in FIG. 5, the mirror assembly may comprise first and second microphones 559, 563. Examples of microphones for use with the present invention are described in commonly assigned U.S. patent applications Ser. Nos. 09/144,176 and 10/076,158, the disclosures of which are incorporated in their entireties herein by reference. As depicted in FIGS. 5, 6 and 7, the microphone or microphones may be mounted on the top of the mirror assembly, on the bottom of the mirror assembly, on the backside of the mirror case, or any where within the mirror case or bezel. Preferably, two microphones are incorporated, one near each end, into the mirror assembly on the backside of the mirror case within recessed portion 659*a* and having an acoustic dam 659*b* as shown in FIGS. 5, 6 and 7. These systems may be integrated, at least in part, in a common control with information displays and/or may share components with the information displays. In addition, the status of these systems and/or the devices controlled thereby may be displayed on the associated information displays.

With further reference to FIG. 5, mirror assembly 502 includes first and second illumination assemblies 567, 571. Various illumination assemblies and illuminators for use with the present invention are described in commonly assigned U.S. Pat. Nos. 5,803,579 and 6,335,548, as well as, commonly assigned U.S. patent application Ser. No. 09/835, 278, the disclosures of which are incorporated in their entireties herein by reference. As further depicted in FIG. 7, each illumination assembly preferably comprises a reflector, a lens and an illuminator (not shown). Most preferably there are two illumination assemblies with on generally positioned to illuminate a front passenger seat area and the second generally positioned to illuminate a driver seat area. There may be only one or may be additional illuminator assemblies such as one to illuminate a center console area, overhead console area or an area between the front seats.

With further reference to FIG. 5, mirror assembly 502 includes first and second switches 575, 577. Suitable switches for use with the present invention are described in detail in commonly assigned U.S. Pat. Nos. 6,407,468 and 6,420,800, as well as, commonly assigned U.S. patent applications Ser. Nos. 09/687,743 and 09/900,500, the disclosures of which are incorporated in their entireties herein by reference. These switches may be incorporated to control the illumination assemblies, the displays, the mirror reflectivity, a voice activated system, a compass system, a telephone system, a highway toll booth interface, a telemetry system, a headlight controller, a rain sensor, etc. Any other display or system described herein or within the references incorporated by reference may be incorporated in any location within the associated vehicle and may be controlled using the switches.

With further reference to FIG. 5, mirror assembly 502 includes first and second indicators 580, 583. Various indicators for use with the present invention are described in commonly assigned U.S. Pat. Nos. 5,803,579 and 6,335,548, as well as, commonly assigned U.S. patent application Ser. No. 09/835,278, the disclosures of which are incorporated in their entireties herein by reference. These indicators may indicate the status of the displays, the mirror reflectivity, a voice activated system, a compass system, a telephone system, a highway toll booth interface, a telemetry system, a headlight controller, a rain sensor, etc. Any other display or system described herein or within the references incorporated by reference may be incorporated in any location within the associated vehicle and may have a status depicted by the indicators.

With further reference to FIG. 5, mirror assembly 502 includes first and second light sensors 586, 588 (glare and ambient sensors 787, 789 in FIG. 7). Preferred light sensors for use within the present invention are described in detail in commonly assigned U.S. Pat. Nos. 5,923,027 and 6,313,457, the disclosures of which are incorporated in their entireties herein by reference. The glare sensor and/or ambient sensor automatically control the reflectivity of a self dimming reflective element as well as the intensity of information displays and/or backlighting. The glare sensor is used to sense headlights of trailing vehicles and the ambient sensor is used to detect the ambient lighting conditions that the system is operating within. In another embodiment, a sky sensor may be incorporated positioned to detect light levels generally above and in front of an associated vehicle, the sky sensor may be used to automatically control the reflectivity of a self-dimming element, the exterior lights of a controlled vehicle and/or the intensity of information displays.

With further reference to FIG. 5, mirror assembly 502 includes first, second, third and fourth operator interfaces 590, 591, 592, 593 located in mirror bezel 555. Each operator interface is shown to comprise a backlit information display "A," "AB," "A1" and "12". It should be understood that these operator interfaces can be incorporated any where in the associated vehicle, for example, in the mirror case, accessory module, instrument panel, overhead console, dash board, seats, center console, etc. Suitable switch construction is described in detail in commonly assigned U.S. Pat. Nos. 6,407,468 and 6,420,800, as well as, commonly assigned U.S. patent applications Ser. Nos. 09/687,743 and 09/900,500, the disclosures of which are incorporated in their entireties herein by reference. These operator interfaces may control the illumination assemblies, the displays, the mirror reflectivity, a voice activated system, a compass system, a telephone system, a highway toll booth interface, a telemetry system, a headlight controller, a rain sensor, etc. Any other display or system described herein or within the references incorporated by reference may be incorporated in any location within the associated vehicle and may be controlled using an operator interface or interfaces. For example, a user may program a display or displays to depict predetermined information or may program a display or displays to scroll through a series of information, or may enter set points associated with certain operating equipment with associated sensor inputs to display certain information upon the occurrence of a given event. In one embodiment, for example, a given display may be in a non-illuminated state until the engine temperature is above a threshold, the display then automatically is set to display the engine temperature. Another example is that proximity sensors located on the rear of a vehicle may be connected to a controller and combined with a display in a rearview mirror to indicate to a driver the distance to an object; the display may be configured as a bar that has a length proportional to the given distance.

Although specific locations and numbers of these additional features are depicted in FIG. 5, it should be understood that fewer or more individual devices may be incorporated in any location within the associated vehicle and as described within the references incorporated herein.

Turning now to FIG. 6 there is shown a section view of a mirror assembly 602. The depicted section of FIG. 6 is taken along cut line 6—6 of FIG. 5. FIG. 6 shows a preferred positional relationship of third and fourth information displays 626, 641 with respect to reflective element 605 along with third information display backlighting 627 within a housing defined by case 656 and bezel 655. Mirror assembly 602 is also shown to comprise a microphone 659; first operator interface 690; along with circuit board 695; mirror mount 657 and accessory module 658. The mirror mount 657 and/or an accessory module 658 may comprise compass sensors, a camera, a headlight control, an additional microprocessor, a rain sensor, additional information displays, additional operator interfaces, etc.

Turning now to FIG. 7, there is shown an exploded view of a mirror assembly 702. FIG. 7 provides additional detail with regard to one preferred positional relationship of individual components, as well as, providing additional structural detail of a mirror assembly. Mirror assembly 702 comprises a reflective element 705 within a bezel 755 and a mirror case 756. A mirror mount 757 is included for mounting the mirror assembly within a vehicle. It should be understood that a host of accessories may be incorporated into the mount 757 such as a rain sensor, a camera, a headlight control, an additional microprocessor, additional information displays, compass sensors, etc. These systems may be integrated, at least in part, in a common control with information displays and/or may share components with the information displays. In addition, the status of these systems and/or the devices controlled thereby may be displayed on the associated information displays.

Mirror assembly 702 is shown in FIG. 7 to further comprise third information display 726 with third information display backlighting 737, 738, 739; first and second microphones 759, 760; a first reflector 768 with a first lens 769; a second reflector 772 with a second lens 773; a glare sensor 787; an ambient light sensor 789; first, second, third and fourth operator interfaces 790, 791, 792, 793 with first, second, third and fourth operator interface backlighting 790a, 791a, 792a, 793a; a circuit board 795 having a compass sensor module 799; and a daughter board 798 with an input/output bus interface 797.

The first reflector 768 combines with the first lens 769 and a first light source (not shown) to form a first illumination assembly. The second reflector 772 combines with the second lens 773 and a second light source (not shown) to form a second illumination assembly. Preferably, the illumination assemblies with associated light source are constructed in accordance with the teachings of commonly assigned U.S. Pat. Nos. 5,803,579 and 6,335,548, as well as, U.S. patent application Ser. No. 09/835,278, the disclosures of which are incorporated in their entireties herein by reference, Preferably, the glare light sensor 787 and the ambient light sensor 789 are active light sensors as described in commonly assigned U.S. Pat. Nos. 6,359,274 and 6,402,328, the disclosures of which are incorporated in their entireties herein by reference. The electrical output signal from either, or both, of the sensors 787, 789 may be used as inputs to a controller 796 to control the reflectivity of reflective element 705 and, or, the intensity of third information display backlighting 727. The details of various control circuits for use herewith are described in commonly assigned U.S. Pat. Nos. 5,956,012; 6,084,700; 6,222,177; 6,224,716; 6,247,819; 6,249,369; 6,392,783 and 6,402,328, the disclosures of which are incorporated in their entireties herein by reference. These systems may be integrated, at least in part, in a common control with information displays and/or may share components with the information displays. In addition, the status of these systems and/or the devices controlled thereby may be displayed on the associated information displays.

Although the compass sensor module 799 is shown to be mounted to circuit board 795 in FIG. 7, it should be understood that the sensor module may be located within mount 757, an accessory module 758 positioned proximate mirror assembly 702 or at any location within an associated vehicle such as under a dash board, in an overhead console, a center console, a trunk, an engine compartment, etc. Commonly assigned U.S. Pat. Nos. 6,023,229 and 6,140,933, as well as, commonly assigned U.S. patent applications Ser. Nos. 10/210,910 and 60/360,723 and entitled Electronic Compass System, the disclosures of which are incorporated in their entireties herein by reference, describe in detail various compass systems for use with the present invention. These systems may be integrated, at least in part, in a common control with information displays and/or may share components with the information displays. In addition, the status of these systems and/or the devices controlled thereby may be displayed on the associated information displays.

Daughter board 798 is in operational communication with circuit board 795. Circuit board 795 may comprise a controller 796, such as a microprocessor, and daughter board 798 may comprise an information display (not shown in FIG. 7). The microprocessor may, for example, receive signal(s) from the compass sensor module 799 and process the signal(s) and transmit signal(s) to the daughter board to control a display to indicate the corresponding vehicle heading. As described herein and within the references incorporated by reference herein, the controller may receive signal(s) from light sensor(s), rain sensor(s) (not shown), automatic vehicle exterior light controller(s) (not shown), microphone(s), global positioning systems (not shown), telecommunication systems (not shown), operator interface(s) and a host of other devices, and control the information display(s) to provide appropriate visual indications.

Controller 796 (or controllers) may, at least in part, control the mirror reflectivity, exterior lights, rain sensor, compass, information displays, windshield wipers, heater, defroster, defogger, air conditioning, telemetry systems, voice recognition systems such as digital signal processor based voice actuation systems, and vehicle speed. The controller 796 (or controllers) may receive signals from switches and or sensors associated with any of the devices described herein and in the references incorporated by reference herein to automatically manipulate any other device described herein or described in the references included by reference. The controller 796 may be, at least in part, located outside the mirror assembly or may comprise a second controller elsewhere in the vehicle or additional controllers throughout the vehicle. The individual processors may be configured to communicate serially, in parallel, via Bluetooth protocol, wireless communication, over the vehicle bus, over a CAN bus or any other suitable communication.

Exterior light control systems as described in commonly assigned U.S. Pat. Nos. 5,990,469; 6008,486; 6,130,421; 6,130,448; 6,255,639; 6,049,171; 5,837,994; 6,403,942; 6,281,632; 6,281,632; 6,291,812 and U.S. patent applications Ser. Nos. 09/448,364; 09/538,389; 09/605,102; 09/678,856; 09/800,460, 09/847,197; 09/938,774; 09/491,192; 60/404,879; 60/394,583; 10/235,476 and 10/208,142, the disclosures of which are incorporated in their entireties herein by reference, may be incorporated in accordance with the present invention. These systems may be integrated, at least in part, in a common control with information displays and/or may share components with the information displays. In addition, the status of these systems and/or the devices controlled thereby may be displayed on the associated information displays.

Moisture sensors and windshield fog detector systems are described in commonly assigned U.S. Pat. Nos. 5,923,027 and 6,313,457, the disclosures of which are incorporated in their entireties herein by reference. These systems may be integrated, at least in part, in a common control with information displays and/or may share components with the information displays. In addition, the status of these systems and/or the devices controlled thereby may be displayed on the associated information displays.

Commonly assigned U.S. Pat. No. 6,262,831, the disclosure of which is incorporated herein by reference in its entirety, describes power supplies for use with the present invention. These systems may be integrated, at least in part, in a common control with information displays and/or may share components with the information displays. In addition, the status of these systems and/or the devices controlled thereby may be displayed on the associated information displays.

The above description is considered that of the preferred embodiments only. Modifications of the invention will occur to those skilled in the art and to those who make or use the invention. Therefore, it is understood that the embodiments shown in the drawings and described above are intendedto satisfy the requirements for disclosing the best mode for carrying out the invention, sufficient description requirement and for illustrative purposes and not intended to limit the scope of the invention.

What is claimed is:

1. A rearview mirror assembly, comprising:
    an information display at least partially positioned behind a reflective element with respect to an anticipated viewer;
    said information display comprising a negative mode, backlit, liquid crystal display having at least two characters, each of said characters has individual backlighting associated therewith, wherein said backlighting of a given character is controllable independent of backlighting of any other character; and
    a diffuser positioned between a backlit liquid crystal display, wherein said diffuser redirects light rays emitted by said backlighting as a function of a planar surface of said diffuser relative to a viewing angle of at least one anticipated viewer.

2. A rearview mirror assembly as in claim 1 further comprising a display driver having more outputs than said liquid crystal display has characters, wherein at least one output of said display driver is used to control said backlighting.

3. A rearview mirror assembly as in claim 1 wherein said reflective element is automatically dimming and the intensity of said backlit liquid crystal display is a function of the refectivity of said automatically dimming reflective element.

4. A rearview mirror assembly as in claim 1 further comprising a diffuser positioned between a backlit liquid crystal display and backlighting associated with said liquid crystal display, wherein said diffuser redirects light rays emitted by said backlighting as a function of the position of said liquid crystal display relative to at least one anticipated viewer.

5. A rearview mirror assembly, comprising:
    an information display at least partially positioned behind a reflective element with respect to an anticipated view;
    said information display comprising a negative mode, backlit, liquid crystal display having at least two characters, each of said characters has individual backlighting associated therewith, wherein said backlighting of a given character is controllable independent of backlighting of any other character; and wherein said reflective element is at least partially transmissive and an optimum light ray wavelength transmission of said reflective element is substantially equal to the predominant wavelength of light rays emitted from said information display.

6. A rearview mirror assembly as in claim 5 wherein said reflective element is automatically dimming and the intensity of said backlit liquid crystal display is a function of an ambient light sensor.

7. A rearview mirror assembly as in claim 5 wherein said reflective element is automatically dimming and the intensity of said backlit liquid crystal display is a function of a glare light sensor.

8. An information display, comprising:
  a liquid crystal display having at least two characters with each character having associated backlighting;
  a display driver having more outputs than said liquid crystal display has characters, wherein at least one output of said display driver is used to control said backlighting; and
  a diffuser positioned between a backlit liquid crystal display, wherein said diffuser redirects light rays emitted by said backlighting as a function of a planar surface of said diffuser relative to a viewing angle of at least one anticipated viewer.

9. An information display as in claim 8 further comprising a diffuser positioned between a backlit liquid crystal display and backlighting associated with said liquid crystal display, wherein said diffuser redirects light rays emitted by said backlighting as a function of the position of said liquid crystal display relative to at least one anticipated viewer.

10. A rearview mirror assembly, comprising:
  a backlit liquid crystal display positioned behind an automatically dimming reflective element, wherein the intensity of said backlit liquid crystal display is a function of the reflectivity of said automatically dimming reflective element, said liquid crystal display having at least two characters, each of said characters has individual backlighting associated therewith, wherein said backlighting of a given character is controllable independent of backlighting of any other character; and
  a diffuser positioned between a backlit liquid crystal display, wherein said diffuser redirects light rays emitted by said backlighting as a function of a planar surface of said diffuser relative to a viewing angle of at least one anticipated viewer.

11. A rearview mirror assembly as in claim 10 further comprising a diffuser positioned between a backlit liquid crystal display and backlighting associated with said liquid crystal display, wherein said diffuser redirects light rays emitted by said backlighting as a function of the position of said liquid crystal display relative to at least one anticipated viewer.

12. A rearview mirror assembly, comprising:
  a backlit liquid crystal display positioned behind an automatically dimming reflective element, wherein the intensity of said backlit liquid crystal display is a function of the reflectivity of said automatically dimming reflective element, said liquid crystal display having at least two characters, each of said characters has individual backlighting associated therewith, wherein said backlighting of a given character is controllable independent of backlighting of any other character; and wherein said reflective element is at least partially transmissive and an optimum light ray wavelength transmission of said reflective element is substantially equal to the predominant wavelength of light rays emitted from said information display.

13. A rearview mirror assembly as in claim 12 wherein said reflective element is automatically dimming and the intensity of said backlit liquid crystal display is a function of an ambient light sensor.

14. A rearview mirror assembly as in claim 12 wherein said reflective element is automatically dimming and the intensity of said backlit liquid crystal display is a function of a glare light sensor.

15. An information display, comprising:
  a diffuser positioned between a backlit liquid crystal display and backlighting associated with said liquid crystal display, wherein said diffuser redirects light rays emitted by said backlighting as a function of at least one of the following; the position of said liquid crystal display relative to at least one anticipated viewer and a planar surface of said diffuser relative to a viewing angle of at least one anticipated viewer, said liquid crystal display having at least two characters, each of said characters has individual backlighting associated therewith, wherein said backlighting of a given character is controllable independent of backlighting of any other character.

16. A rearview mirror assembly, comprising:
  an information display at least partially positioned behind a reflective element with respect to an anticipated viewer;
  said information display comprising a negative mode, backlit, liquid crystal display having at least two characters, each of said characters has individual backlighting associated therewith, wherein said backlighting of a given character is controllable independent of backlighting of any other character;
  a display driver having more outputs than said liquid crystal display has characters, wherein at least one output of said display driver is used to control said backlighting; and
  a diffuser positioned between a backlit liquid crystal display and backlighting associated with said liquid crystal display, wherein said diffuser redirects light rays emitted by said backlighting as a function of at least one of the following; the position of said liquid crystal display relative to at least one anticipated viewer and a planar surface of said diffuser relative to a viewing angle of at lest one anticipated viewer;
  wherein said reflective element is automatically dimming and the intensity of said backlit liquid crystal display is a function of the reflectivity of said automatically dimming reflective element; and
  wherein said reflective element is at least partially transmissive and an optimum light ray wavelength transmission of said reflective element is substantially equal to the predominant wavelength of light rays emitted from said information display.

17. A rearview mirror assembly as in claim 16 wherein said reflective element is automatically dimming and the intensity of said backlit liquid crystal display is a function of an ambient light sensor.

18. A rearview mirror assembly as in claim 16 wherein said reflective element is automatically dimming and the intensity of said backlit liquid crystal display is a function of a glare light sensor.

19. A rearview mirror assembly, comprising:
a information display and a reflective element, wherein said reflective element is at least partially transmissive and an optimum light ray wavelength transmission of said reflective element is substantially equal to the predominant wavelength of light rays emitted by said information display, said information display is a liquid crystal display having at least two characters, each of said characters has individual backlighting associated therewith, wherein said backlighting of a given character is controllable independent of backlighting of any other character.

20. A rearview mirror assembly as in claim 19 wherein said reflective element is automatically dimming and the intensity of said backlit liquid crystal display is a function of an ambient light sensor.

21. A rearview mirror assembly as in claim 19 wherein said reflective element is automatically dimming and the intensity of said backlit liquid crystal display is a function of a glare light sensor.

* * * * *